US010878815B2

(12) United States Patent
Williams et al.

(10) Patent No.: US 10,878,815 B2
(45) Date of Patent: *Dec. 29, 2020

(54) PROCESSING SPOKEN COMMANDS TO CONTROL DISTRIBUTED AUDIO OUTPUTS

(71) Applicant: Amazon Technologies, Inc., Seattle, WA (US)

(72) Inventors: Robert Williams, San Francisco, CA (US); Steven Todd Rabuchin, Kirkland, WA (US); Gregory Michael Hart, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,296

(22) Filed: Apr. 15, 2019

(65) Prior Publication Data

US 2020/0013397 A1 Jan. 9, 2020

Related U.S. Application Data

(63) Continuation of application No. 15/819,502, filed on Nov. 21, 2017, now Pat. No. 10,262,657, which is a (Continued)

(51) Int. Cl.
*H04B 3/00* (2006.01)
*H03G 3/20* (2006.01)
(Continued)

(52) U.S. Cl.
CPC .............. *G10L 15/22* (2013.01); *G06F 3/165* (2013.01); *G06F 16/68* (2019.01); *G06F 40/40* (2020.01);
(Continued)

(58) Field of Classification Search
CPC .... G06F 16/68; G06F 17/28; G06F 17/30749; G06F 3/165; G10L 13/02; G10L 15/22; (Continued)

(56) References Cited

U.S. PATENT DOCUMENTS 4,401,852 A * 8/1983 Noso .................. B60R 16/0373
367/198
5,844,158 A * 12/1998 Butler .................. H04M 3/487
84/650
(Continued)

*Primary Examiner* — Khai N. Nguyen
(74) *Attorney, Agent, or Firm* — Pierce Atwood LLP

(57) ABSTRACT

A system that is capable of controlling multiple entertainment systems and/or speakers using voice commands. The system receives voice commands and may determine audio sources and speakers indicated by the voice commands. The system may generate audio data from the audio sources and may send the audio data to the speakers using multiple interfaces. For example, the system may send the audio data directly to the speakers using a network address, may send the audio data to the speakers via a voice-enabled device or may send the audio data to the speakers via a speaker controller. The system may generate output zones including multiple speakers and may associate input devices with speakers within the output zones. For example, the system may receive a voice command from an input device in an output zone and may reduce output audio generated by speakers in the output zone.

20 Claims, 27 Drawing Sheets

Related U.S. Application Data continuation of application No. 15/083,902, filed on Mar. 29, 2016, now Pat. No. 9,858,927.

(60) Provisional application No. 62/294,926, filed on Feb. 12, 2016.

(51) Int. Cl.

| | |
|---|---|
| *H04R 3/00* | (2006.01) |
| *H04R 27/00* | (2006.01) |
| *H04R 29/00* | (2006.01) |
| *G10L 15/22* | (2006.01) |
| *G10L 13/02* | (2013.01) |
| *H04R 3/12* | (2006.01) |
| *G06F 3/16* | (2006.01) |
| *G06F 16/68* | (2019.01) |
| *G06F 40/40* | (2020.01) |
| *G10L 21/0364* | (2013.01) |

(52) U.S. Cl.
CPC ............ *G10L 13/02* (2013.01); *H04R 3/12* (2013.01); *G10L 21/0364* (2013.01); *G10L 2015/223* (2013.01); *H04R 2420/07* (2013.01); *H04R 2430/01* (2013.01)

(58) Field of Classification Search
CPC .......... G10L 2015/223; G10L 21/0364; H04R 2420/07; H04R 2430/01; H04R 3/12
USPC ............................................ 381/59, 85, 334
See application file for complete search history.

(56) References Cited

U.S. PATENT DOCUMENTS

| | | | | |
|---|---|---|---|---|
| 7,643,894 | B2* | 1/2010 | Braithwaite | H04N 21/2662 |
| | | | | 700/94 |
| 8,725,277 | B2* | 5/2014 | Braithwaite | H04L 67/10 |
| | | | | 700/94 |
| 8,874,448 | B1* | 10/2014 | Kauffmann | H04M 1/6016 |
| | | | | 704/278 |
| 9,087,520 | B1* | 7/2015 | Salvador | G10L 25/84 |
| 9,098,467 | B1* | 8/2015 | Blanksteen | G10L 15/22 |
| 9,271,111 | B2* | 2/2016 | Blanksteen | H04L 67/22 |
| 9,437,186 | B1* | 9/2016 | Liu | G10L 15/05 |
| 9,477,217 | B2* | 10/2016 | Gardner | G06F 3/167 |
| 9,484,030 | B1* | 11/2016 | Meaney | H04R 3/005 |
| 9,633,661 | B1* | 4/2017 | Typrin | G10L 15/02 |
| 9,858,927 | B2* | 1/2018 | Williams | G10L 13/02 |
| 9,898,250 | B1* | 2/2018 | Williams | G06F 3/165 |
| 9,930,402 | B2* | 3/2018 | Hou | H04N 21/4223 |
| 10,262,657 | B1* | 4/2019 | Williams | H04R 3/12 |
| 10,552,118 | B2* | 2/2020 | Abuelsaad | G10L 15/08 |
| 2005/0131558 | A1* | 6/2005 | Braithwaite | H04R 27/00 |
| | | | | 700/94 |
| 2008/0109095 | A1* | 5/2008 | Braithwaite | H04L 67/10 |
| | | | | 700/94 |
| 2010/0064218 | A1* | 3/2010 | Bull | G06F 3/167 |
| | | | | 715/716 |
| 2010/0158219 | A1* | 6/2010 | Dhawan | H04M 3/4936 |
| | | | | 379/88.18 |
| 2012/0096018 | A1* | 4/2012 | Metcalf | G11B 27/105 |
| | | | | 707/758 |
| 2013/0132081 | A1* | 5/2013 | Ryu | H04N 21/25808 |
| | | | | 704/235 |
| 2013/0169884 | A1* | 7/2013 | Huang | H03G 3/32 |
| | | | | 348/738 |
| 2013/0179168 | A1* | 7/2013 | Bae | H03G 3/3005 |
| | | | | 704/248 |
| 2013/0339031 | A1* | 12/2013 | Yoon | H04N 21/42203 |
| | | | | 704/275 |
| 2014/0095176 | A1* | 4/2014 | Kim | H04N 21/4394 |
| | | | | 704/275 |
| 2014/0172953 | A1* | 6/2014 | Blanksteen | H04W 4/33 |
| | | | | 709/203 |
| 2014/0176813 | A1* | 6/2014 | Conness | G06F 3/165 |
| | | | | 348/738 |
| 2015/0081274 | A1* | 3/2015 | Kawamura | G06F 40/58 |
| | | | | 704/3 |
| 2015/0104037 | A1* | 4/2015 | Lee | H04R 3/12 |
| | | | | 381/80 |
| 2015/0139464 | A1* | 5/2015 | Guo | H04R 1/025 |
| | | | | 381/334 |
| 2015/0162006 | A1* | 6/2015 | Kummer | H04N 21/47217 |
| | | | | 704/275 |
| 2015/0170665 | A1* | 6/2015 | Gundeti | G06F 3/165 |
| | | | | 704/270.1 |
| 2015/0193193 | A1* | 7/2015 | Khaira | G06F 3/0414 |
| | | | | 381/109 |
| 2015/0254053 | A1* | 9/2015 | Gardner | H03G 3/04 |
| | | | | 700/83 |
| 2016/0034249 | A1* | 2/2016 | Lee | G06F 3/017 |
| | | | | 704/275 |
| 2016/0035352 | A1* | 2/2016 | Furumoto | G10L 15/22 |
| | | | | 704/276 |
| 2016/0210966 | A1* | 7/2016 | Koganei | H04N 21/42203 |
| 2016/0249437 | A1* | 8/2016 | Sun | H05B 47/105 |
| 2016/0295340 | A1* | 10/2016 | Baker | H04R 1/403 |
| 2016/0353217 | A1* | 12/2016 | Starobin | G06F 3/041 |
| 2016/0379638 | A1* | 12/2016 | Basye | G10L 15/18 |
| | | | | 704/235 |
| 2017/0229121 | A1* | 8/2017 | Taki | G10L 15/22 |
| 2017/0236512 | A1* | 8/2017 | Williams | G06F 40/40 |
| | | | | 381/79 |
| 2019/0246235 | A1* | 8/2019 | Bruser | G06F 3/017 |
| 2019/0324712 | A1* | 10/2019 | Abuelsaad | G10L 15/08 |
| 2020/0013397 | A1* | 1/2020 | Williams | G06F 16/68 |

\* cited by examiner

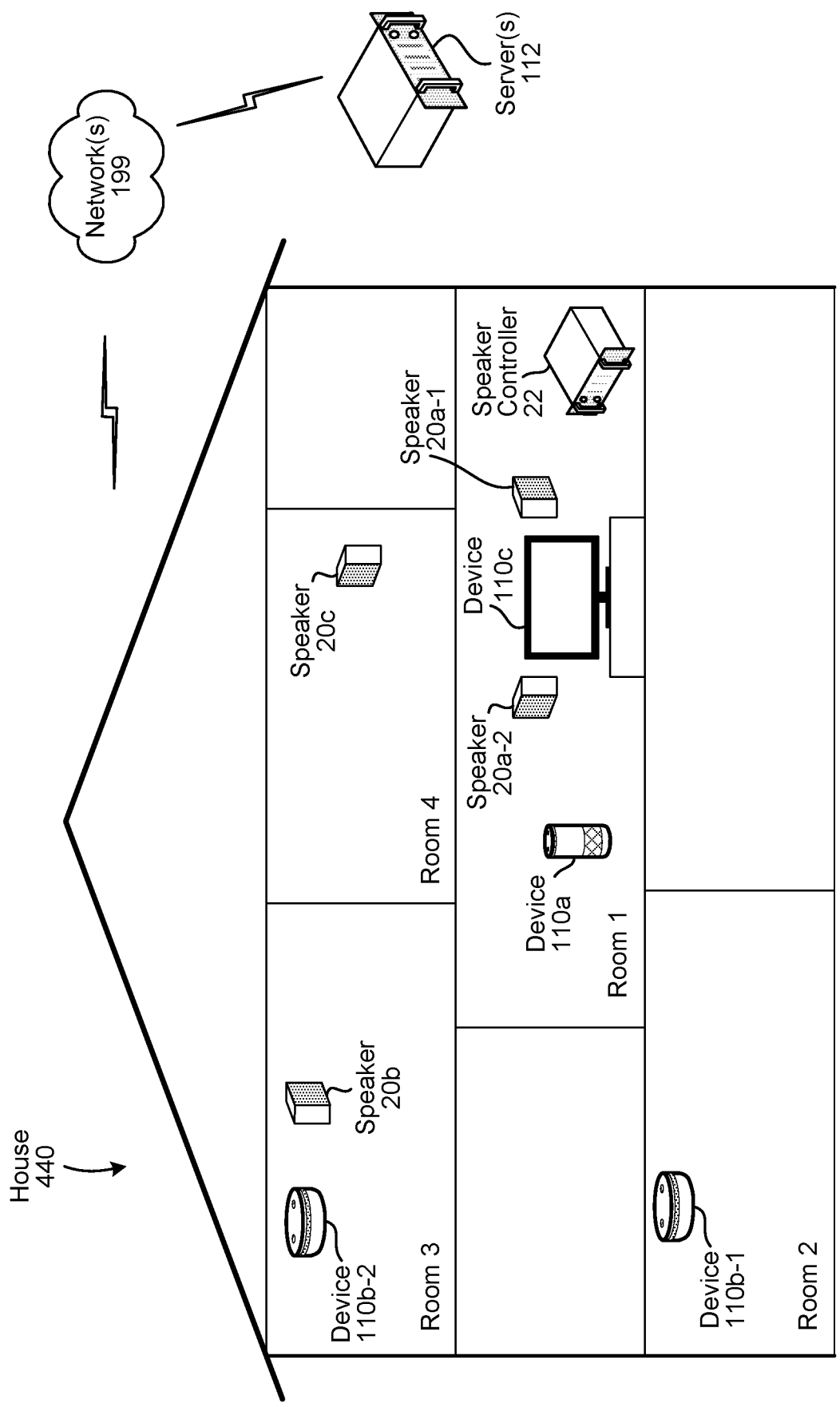

Interface 510

| Output Devices | |
|---|---|
| Device | Location |
| Speaker 20a-1 | Room 1 |
| Speaker 20a-2 | Room 1 |
| Speaker 20b | Room 3 |
| Speaker 20c | Room 4 |
| Device 110a | Room 1 |
| Device 110c | Room 1 |

Output Zones — Interface 520

| Zone | Device | Location |
|---|---|---|
| Zone 1 | Speaker 20a-1 | Room 1 |
| Zone 1 | Speaker 20a-2 | Room 1 |
| Zone 1 | Device 110a | Room 1 |
| Zone 1 | Device 110c | Room 1 |
| Zone 2 | Speaker 20b | Room 3 |
| Zone 3 | Speaker 20c | Room 4 |

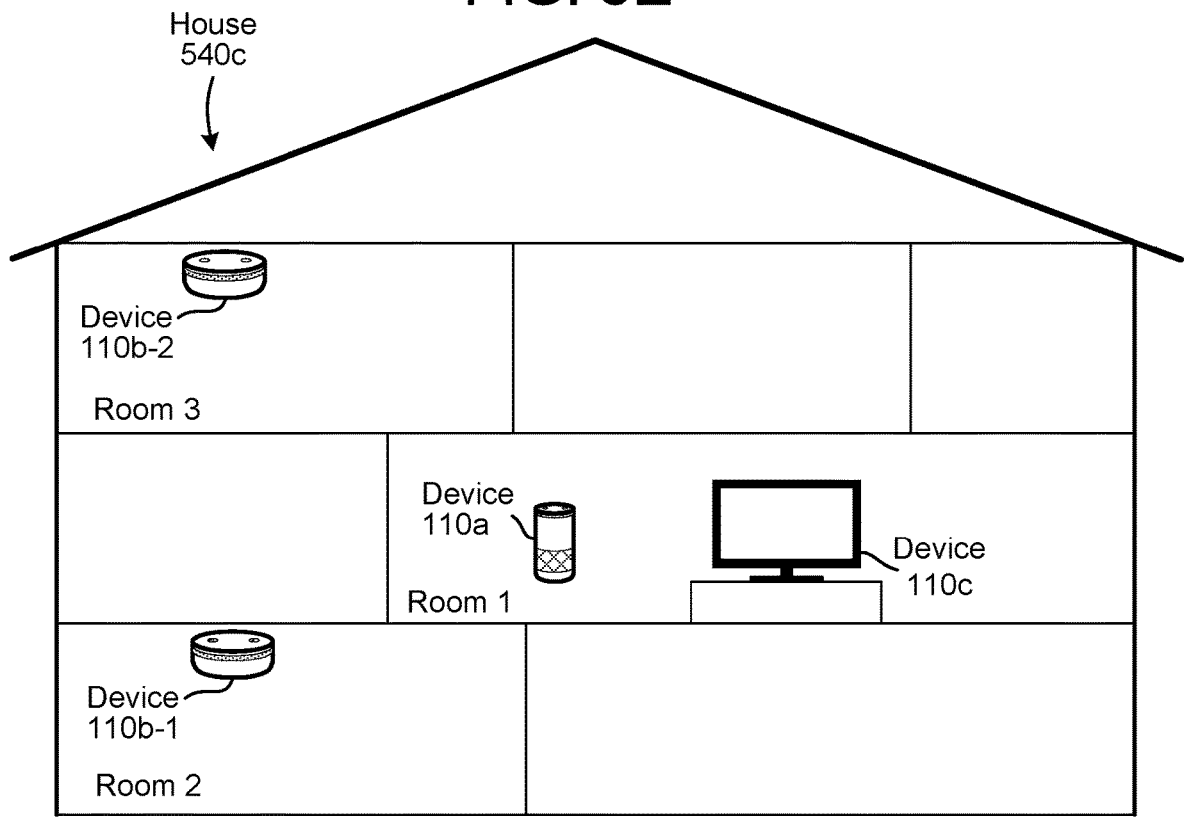

Interface 550

Input/Output Associations

| Zone | Input(s) | Output(s) |
| --- | --- | --- |
| Zone 1 | Device 110a | Speaker 20a-1 |
|  | Device 110c | Speaker 20a-2 |
| Zone 2 | Device 110b-2 | Speaker 20b |
| Zone 3 |  | Speaker 20c |
| Zone 4 | Device 110b-1 |  |

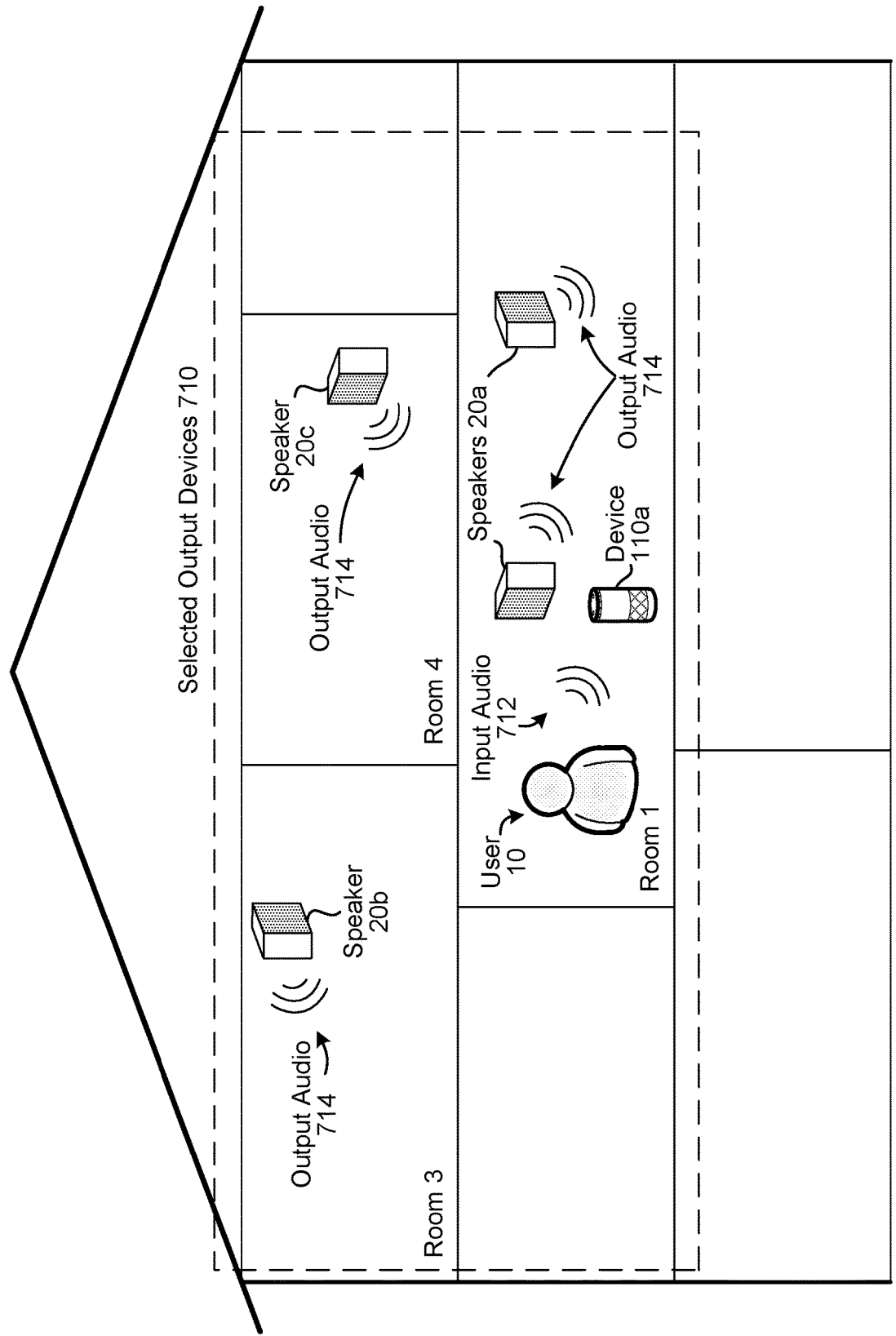

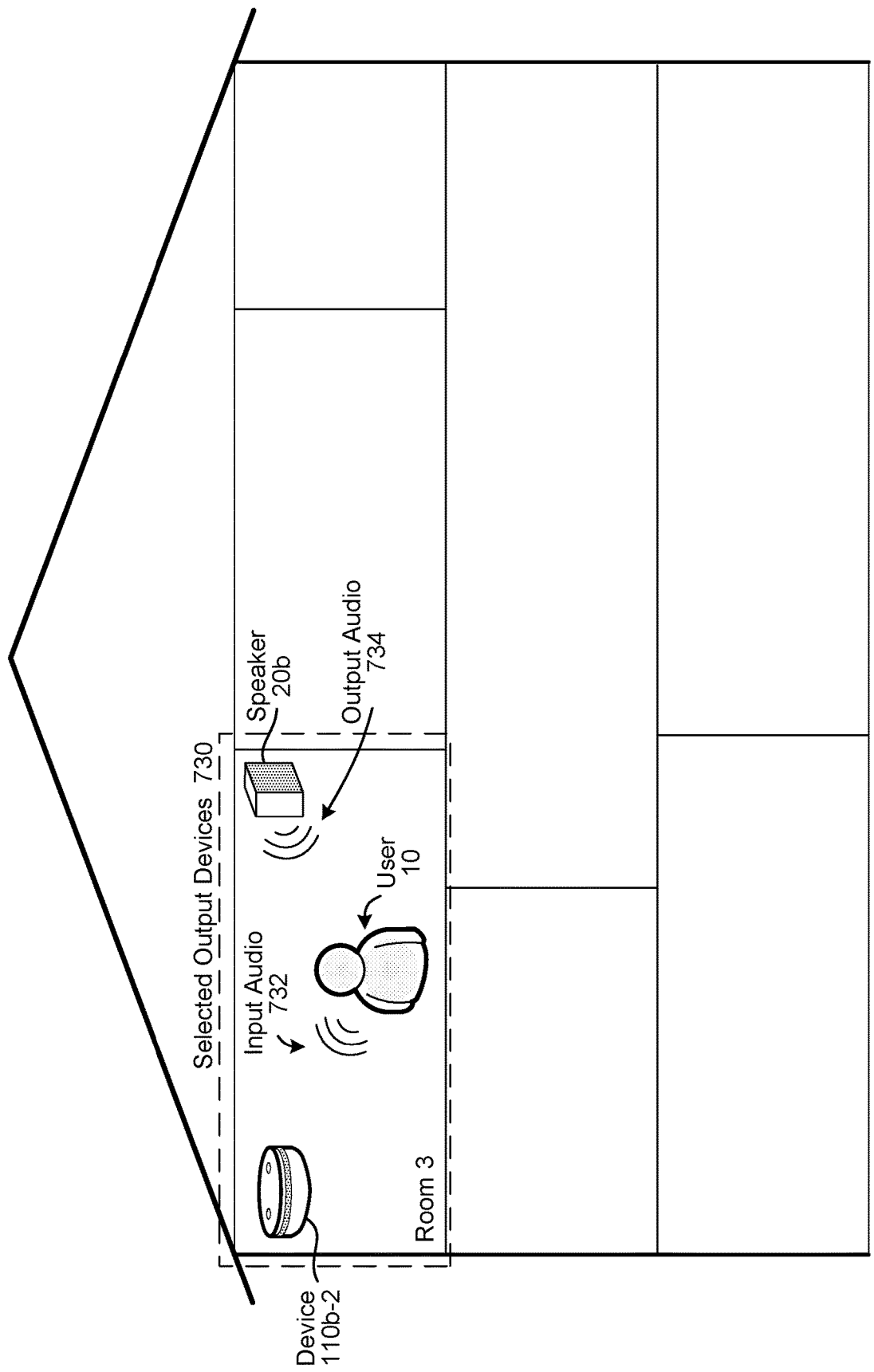

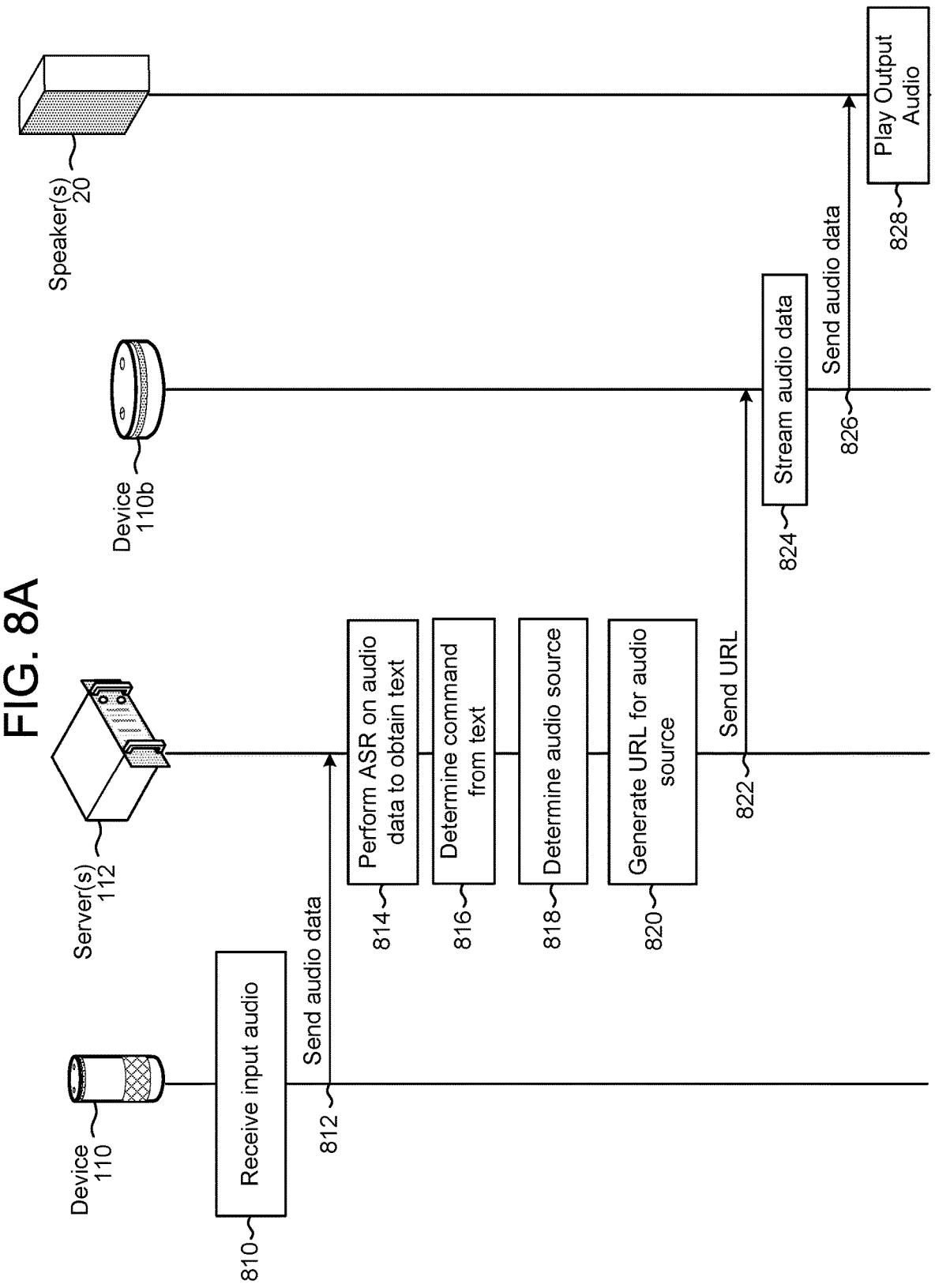

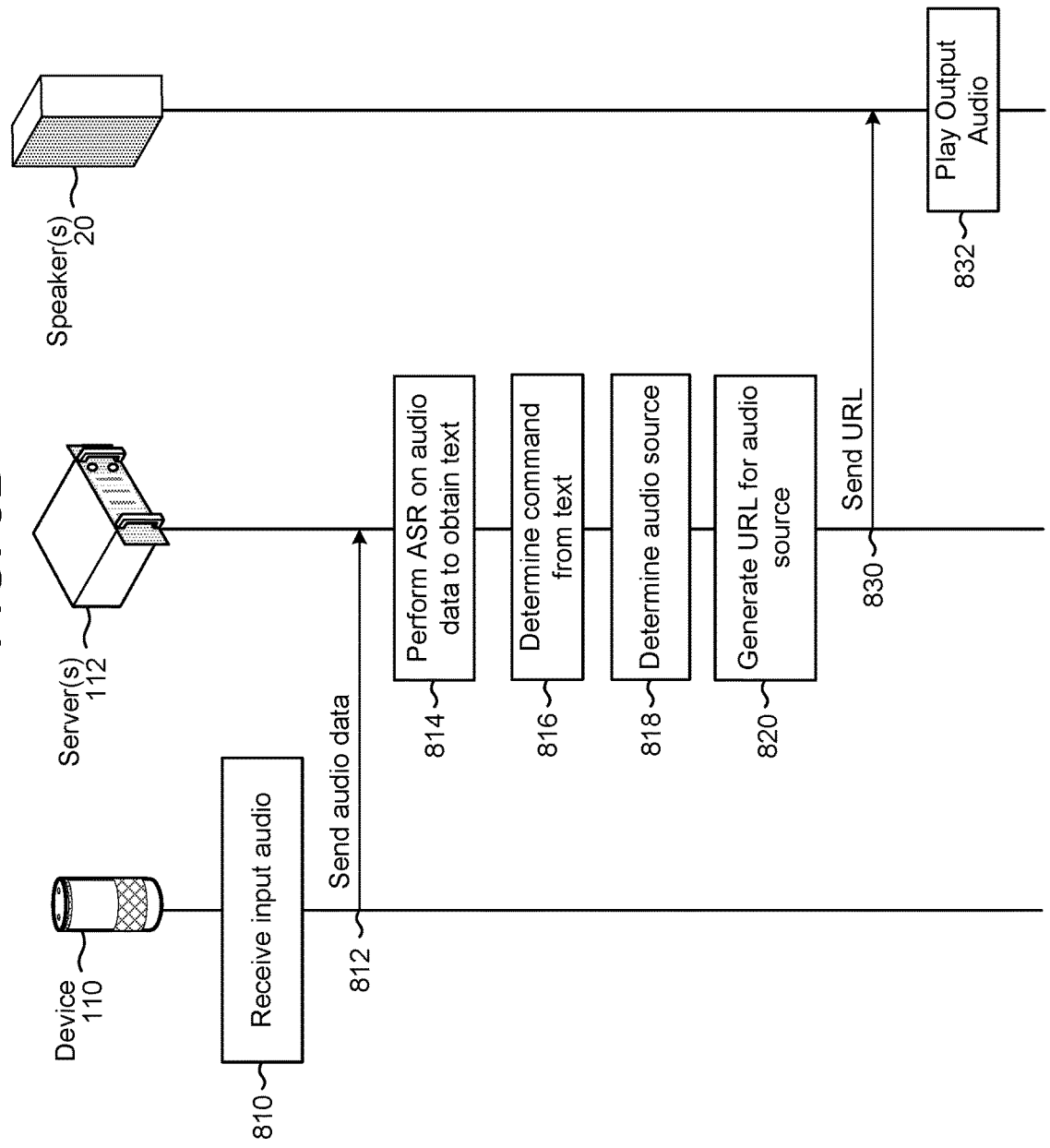

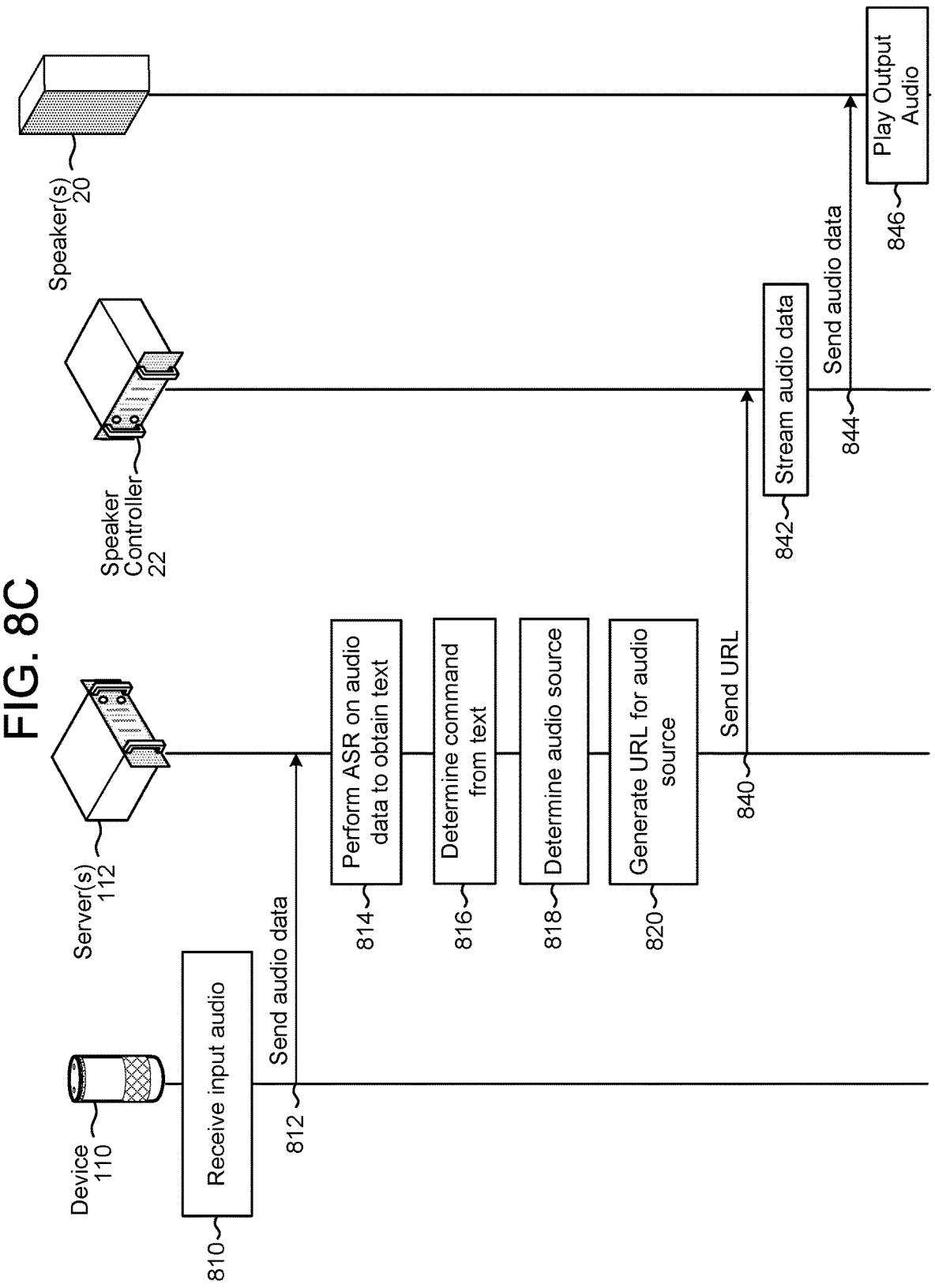

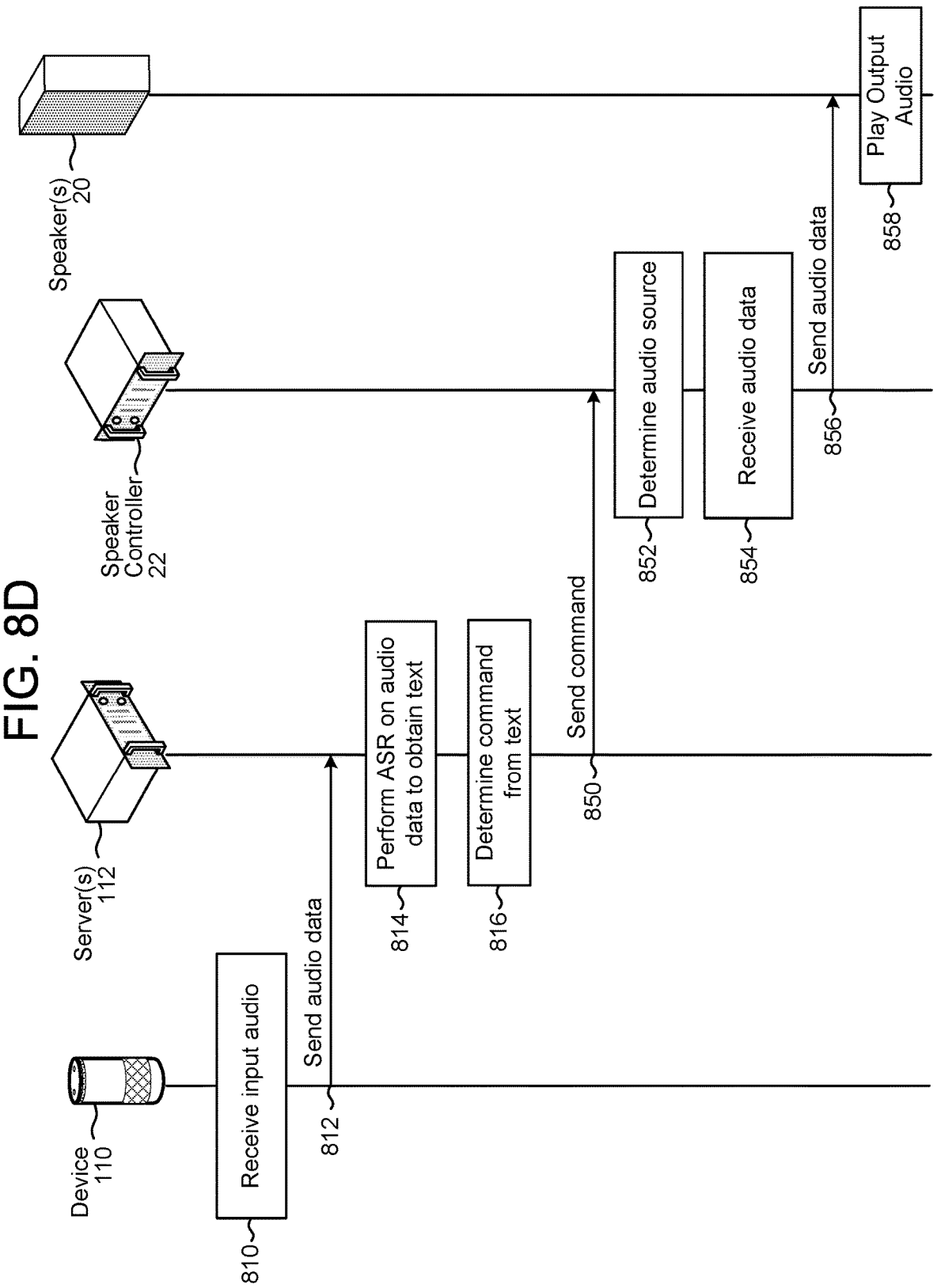

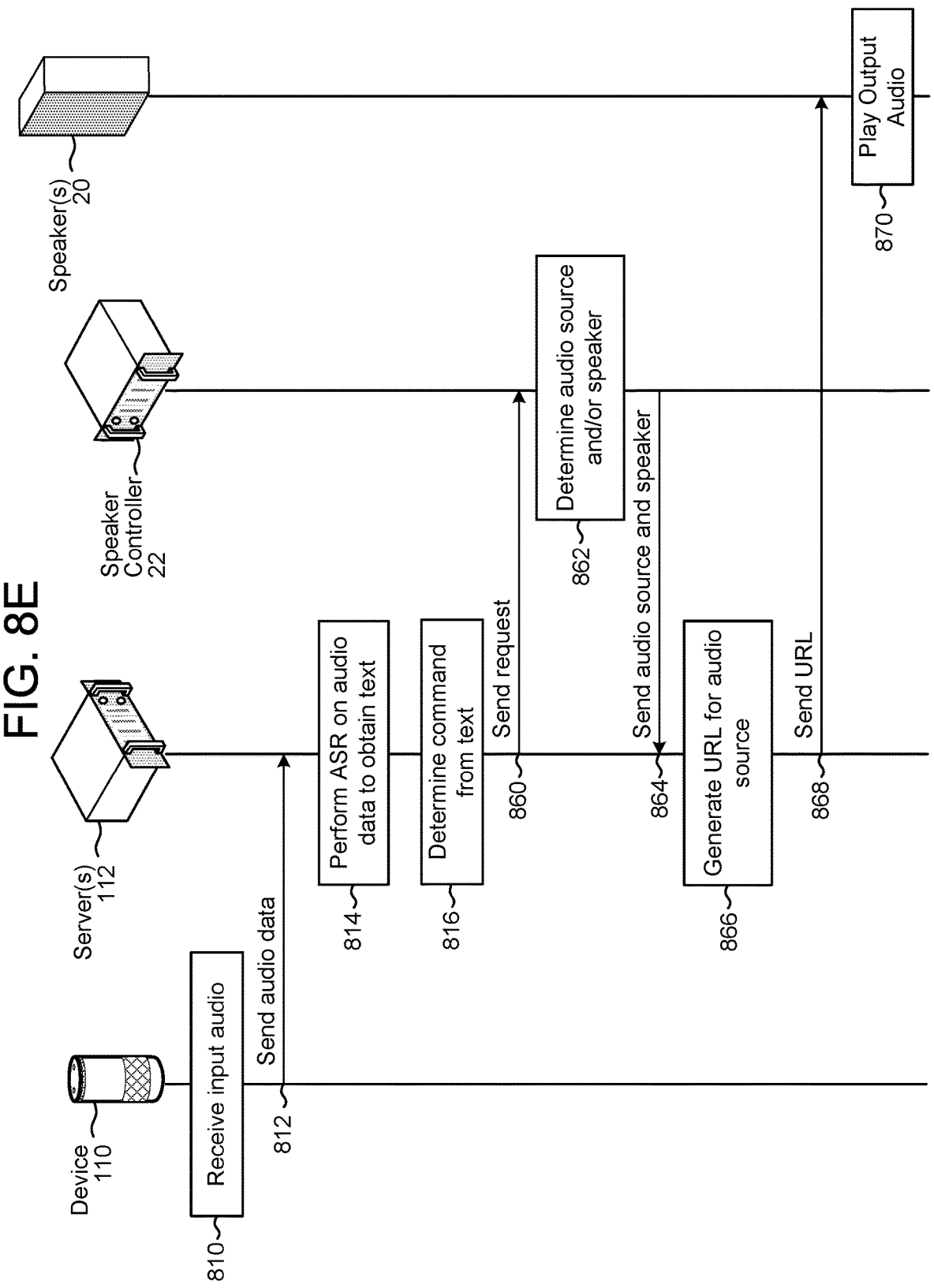

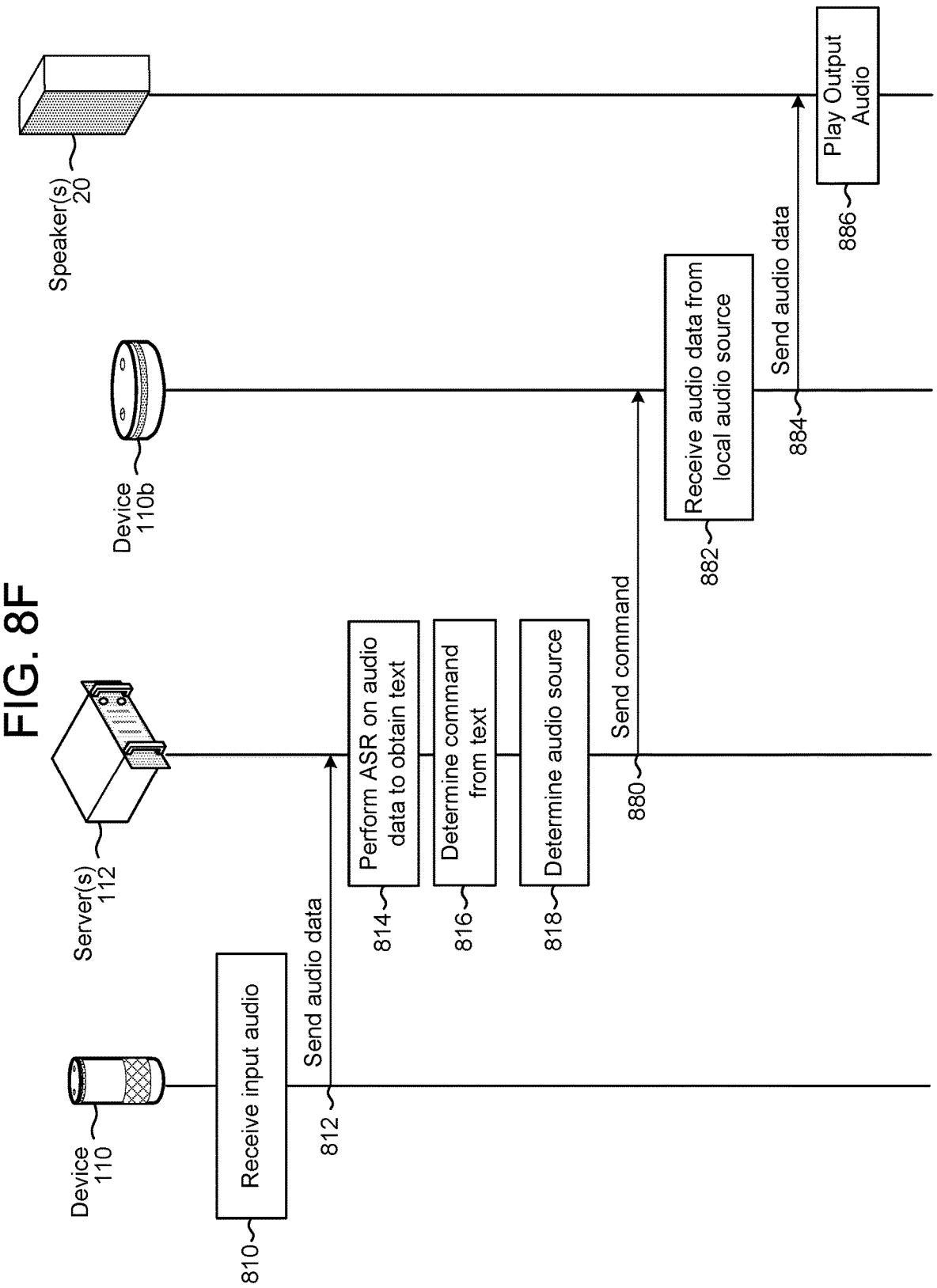

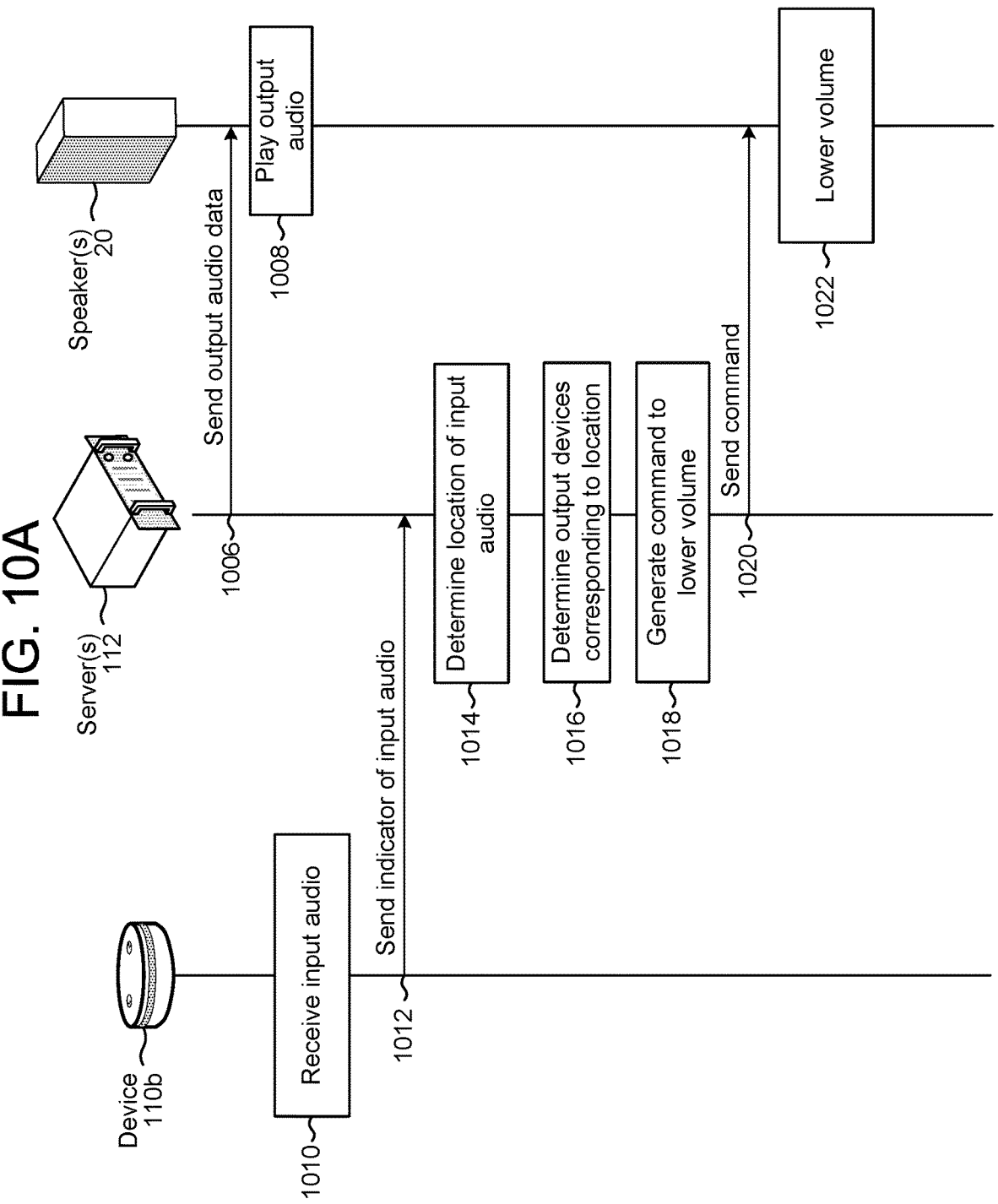

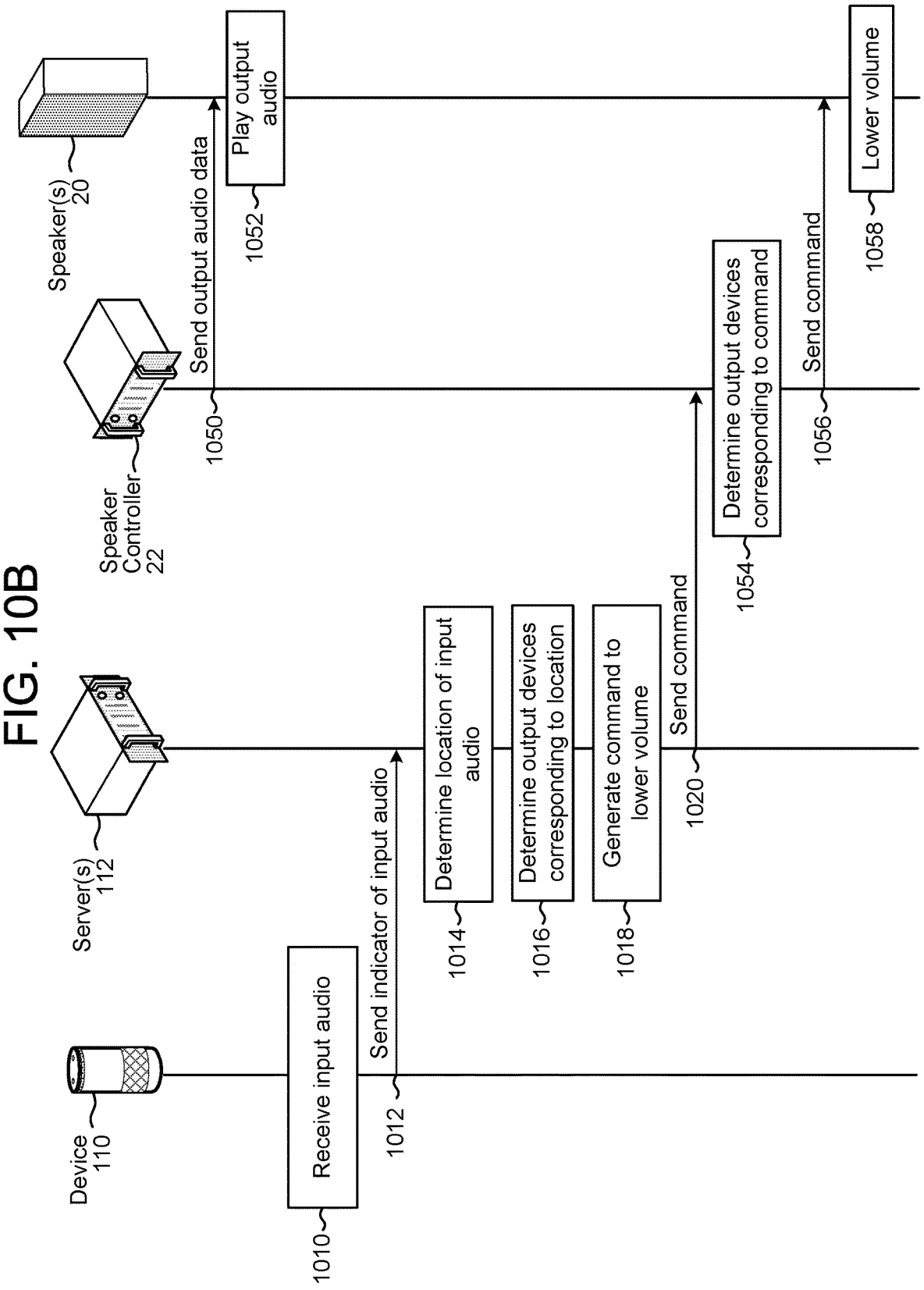

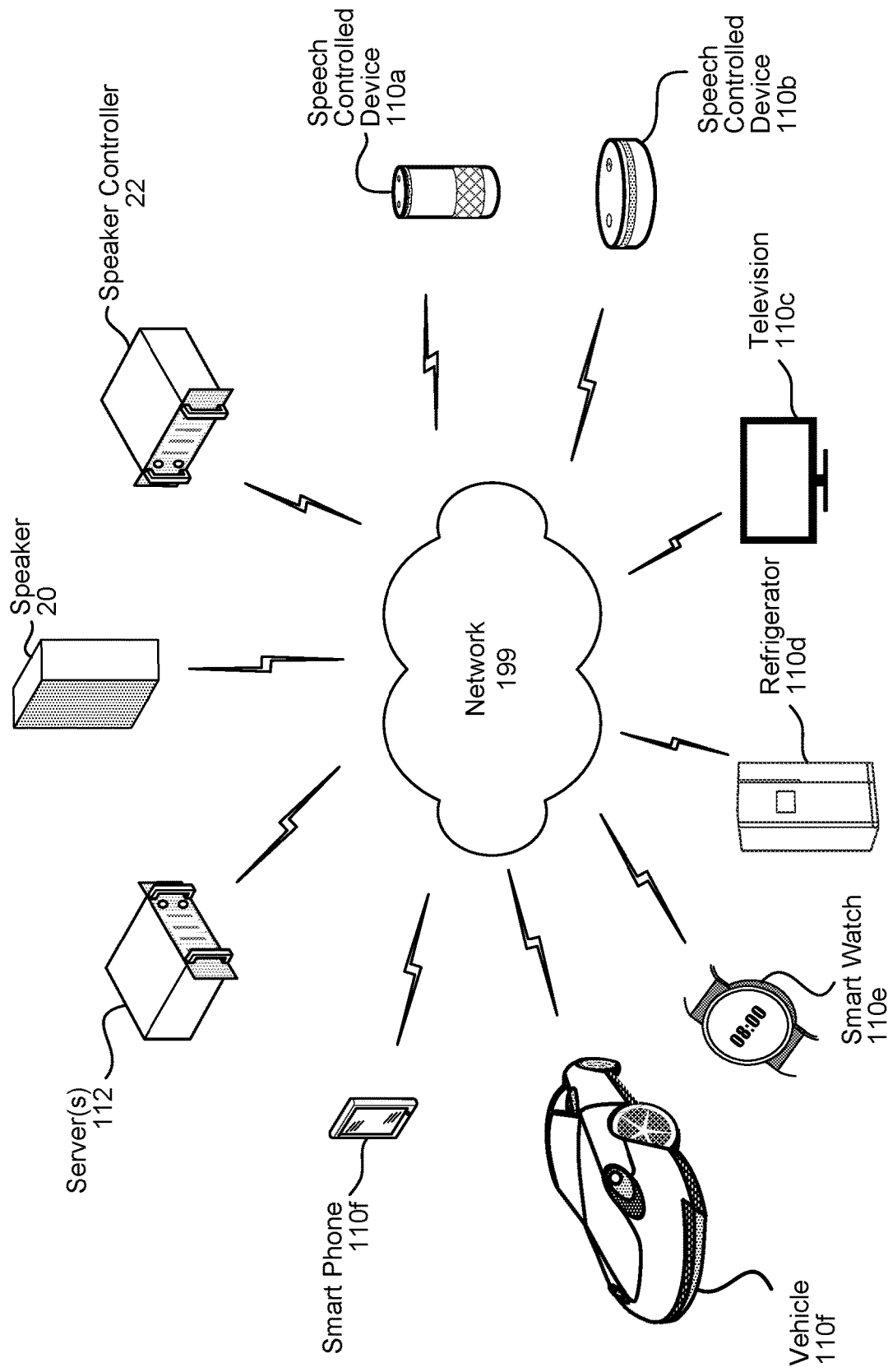

PROCESSING SPOKEN COMMANDS TO CONTROL DISTRIBUTED AUDIO OUTPUTS

CROSS-REFERENCE TO RELATED APPLICATION DATA

This application is a continuation of, and claims the benefit of priority of, Non-provisional patent application Ser. No. 15/819,502, entitled "Processing Spoken Commands to Control Distributed Audio Outputs," filed on Nov. 21, 2017, and scheduled to issue as U.S. Pat. No. 10,262,657 on Apr. 16, 2019, which is a continuation of, and claims the benefit of priority of, U.S. Non-Provisional patent application Ser. No. 15/083,902, entitled "Processing Spoken Commands to Control Distributed Audio Outputs," filed on Mar. 29, 2016, and issued on Jan. 2, 2018, as U.S. Pat. No. 9,858,927, which claims the benefit of priority of U.S. Provisional Patent Application 62/294,926, entitled "Processing Spoken Commands to Control Distributed Audio Outputs," filed on Feb. 12, 2016. The above applications are herein incorporated by reference in their entireties.

BACKGROUND

Homes are becoming more wired and connected with the proliferation of computing devices such as desktops, tablets, entertainment systems, speakers and portable communication devices. As these computing devices evolve, many different ways have been introduced to allow users to interact with computing devices, such as through mechanical devices (e.g., keyboards, mice, etc.), touch screens, motion, and gesture. Another way to interact with computing devices is through natural language input such as speech input.

BRIEF DESCRIPTION OF DRAWINGS

For a more complete understanding of the present disclosure, reference is now made to the following description taken in conjunction with the accompanying drawings.

FIGS. 4A-4D illustrate examples of generating output audio according to embodiments of the present disclosure.

FIGS. 5A-5H illustrate examples of configurations for input devices and output devices according to embodiments of the present disclosure.

FIGS. 7A-7D illustrate examples of controlling output devices according to embodiments of the present disclosure.

FIGS. 8A-8F illustrate communications and operations among devices to generate and control output audio according to embodiments of the present disclosure.

FIGS. 10A-10B illustrate communication and operations among devices to determine that a voice command is being received and lower a volume of corresponding output audio according to embodiments of the present disclosure.

FIG. 14 illustrates an example of a computer network for use with the system.

DETAILED DESCRIPTION

An environment may include a number of different entertainment systems, including standalone speakers, wired speakers, wireless speakers or the like. However, the different entertainment systems may be separated as different devices are controlled separately from each other. In addition, the devices may be controlled using mechanical inputs, such as buttons, touchpads or the like.

In some instances, the environment includes one or more devices configured to receive voice commands from the user and to cause performance of the operations requested via these voice commands. Such a device, which may be known as a "voice-controlled device", may include one or more microphones for generating audio signals that represent or are otherwise associated with sound from an environment, including voice commands of the user. The voice-controlled device may also be configured to perform automatic speech recognition (ASR) on the audio signals, or may be configured to provide the audio signals to another device (e.g., a device of a remote service) for performing the ASR on the audio signals. After the voice-controlled device or another device identifies a voice command of the user, the voice-controlled device or the other device may attempt to the requested operation to be performed.

Offered is a system that receives input voice commands using the voice-controlled device and interacts with and at least partly controls the other devices in the environment, such as entertainment systems and/or speakers. As such, a user may issue voice commands to the voice-controlled device relating to these other devices. For example, a user may issue a voice command to the voice-controlled device to "play some Rolling Stones in the living room." The voice-controlled device or another device may perform ASR on a generated audio signal to identify the command ("play some Rolling Stones") along with the referenced device (speakers located "in the living room"). The user may have previously indicated that particular speakers within the environment are to be associated with the living room and, hence, the voice-controlled device or another device may determine which device on which to "play music." Therefore, using the techniques described herein, a user is able to conveniently interact with multiple entertainment systems/speakers at one time using voice commands. Additionally or alternatively, the system may send audio data directly to the multiple entertainment systems/speakers in response to the voice commands.

Figure 1:
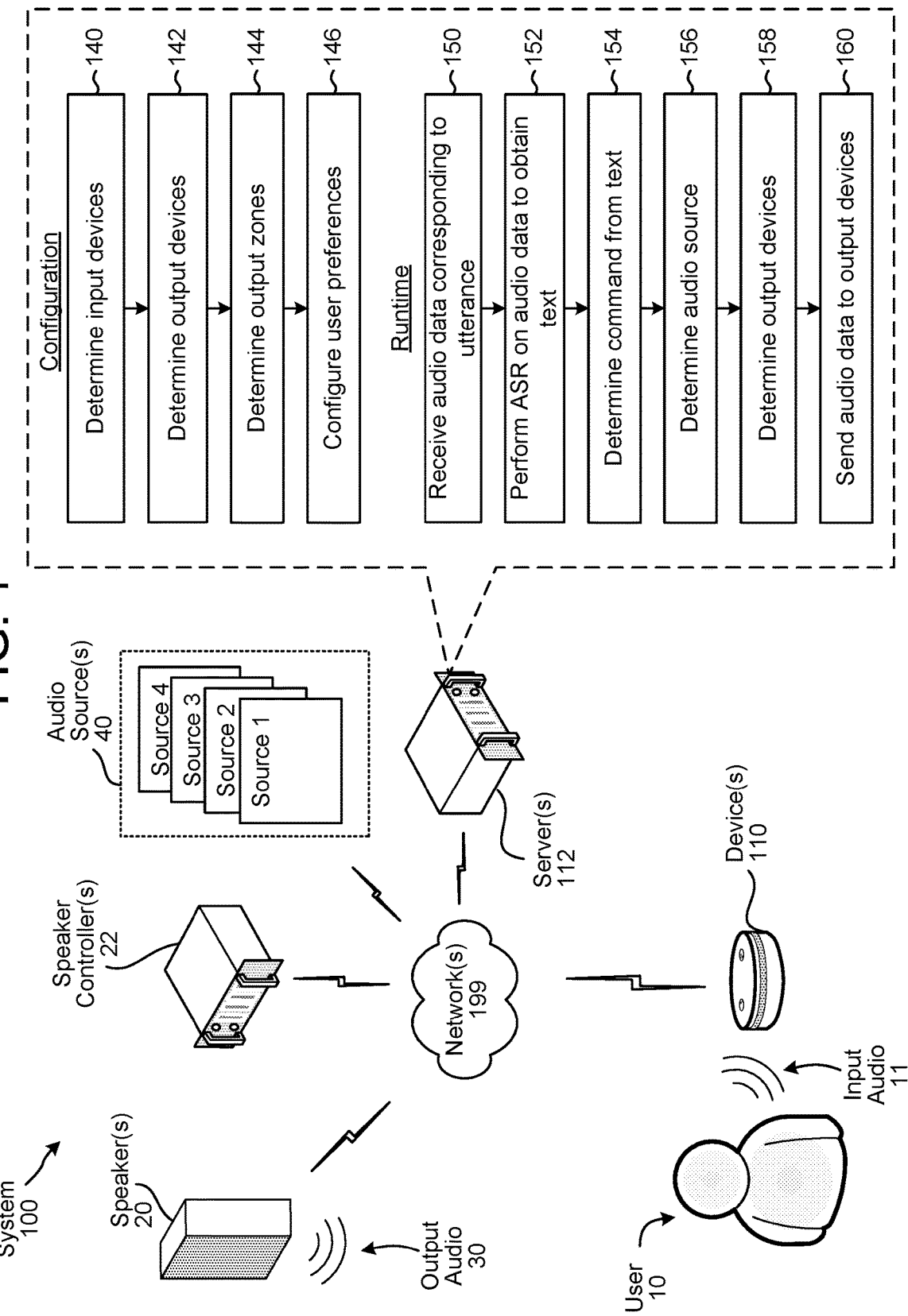
FIG. 1 illustrates a system for configuring input and output devices and sending audio to output devices according to embodiments of the present disclosure.

FIG. 1 illustrates a system 100 configured to receive and execute spoken commands to control output audio 30 generated by speaker(s) 20. As illustrated in FIG. 1, the system 100 may include one or more devices 110 local to user(s) 10, as well as one or more networks 199 and one or more server(s) 112 connected to the device(s) 110 across network(s) 199. The server(s) 112 may be capable of performing traditional speech processing (such as ASR and NLU) as described herein. A single server 112 may be capable of performing all speech processing or multiple server(s) 112 may combine to perform the speech processing. In addition, certain speech detection or command execution functions may be performed by device 110.

The server(s) 112 may be configured to identify input devices (e.g., device(s) 110), identify output devices (e.g., speaker(s) 20, speaker controller(s) 22, device(s) 110), determine output zones (e.g., select a portion of the output devices to collectively control), identify locations and nicknames of the input devices/output devices and/or configure preferences of the user 10. For example, the server(s) 112 may determine interfaces with which to communicate with the output devices, determine network addresses associated with the output devices, associate input device(s) with output device(s) based on proximity (e.g., associate a device 110 in a living room with speakers 20 located in the living room), group output devices in a preferred zone (e.g., select speakers 20 located in the living room as a first zone), or the like. To configure the input devices/output devices, the server(s) 112 may receive spoken input (e.g., input audio 11) via the device(s) 110 and/or may display a graphical user interface (GUI) using a companion application running on a local device (not shown) (e.g., smartphone, computer or the like) and may receive input via the local device.

The server(s) 112 may be configured to execute certain commands, such as commands spoken by the user 10. For example, the user 10 may instruct the device(s) 110/server(s) 112 to play audio (e.g., music, radio stations or the like) from audio source(s) 40, to stop playing the audio, to increase or decrease a volume of the audio, to mute the audio, to select speaker(s) 20 and/or zones with which to play the audio, or the like. In addition, the server(s) 112 may generate a voice override command to reduce the volume of the audio when the device(s) 110 detects input audio 11. In response to the commands, the server(s) 112 may identify an audio source 40 from which to stream audio data, may identify an output device (e.g., speaker(s) 20) to which to stream the audio data, may generate a Uniform Resource Identifier (URI) (e.g., Uniform Resource Locator (URL) or the like) with which to send the audio data to the output device and/or may send commands to the output device.

The system may include speaker(s) 20, which may receive communication using various interfaces. For example, a first speaker 20a may communicate with a network controller 22 using a wired connection (e.g., audio line out or the like) or a wireless connection (e.g., Wifi, Bluetooth or the like), a second speaker 20b may communicate with a device 110 using a wired connection or a wireless connection, and a third speaker 20c may communicate with the server(s) 112 via the network(s) 199. Thus, the server(s) 112 may send audio data to the speaker(s) 20 directly, via the device(s) 110 and/or via the speaker controller(s) 22. The speaker controller(s) 22 may be servers or other types of devices that may control the speaker(s) 20 and communicate with other devices in the system, such as server(s) 112. For example, a speaker controller 22 may control multiple speakers 20 and may send audio data to the multiple speakers 20 so that the multiple speakers 20 collectively generate output audio 30. The speaker controller(s) 22 may be located in proximity to the speaker(s) 20 (e.g., in a residential home) or remote to the speaker(s) 20 (e.g., connected via the internet). In some examples, the server(s) 112 may instruct the speaker controller(s) 22 to select an audio source 40 and the speaker controller(s) 22 may send audio data to the speaker(s) 20. However, the present disclosure is not limited thereto and the server(s) 112 may select the audio source 40 and send the audio data to the speaker(s) 20 directly or via the speaker controller(s) 22.

As illustrated in FIG. 1, the server(s) 112 may determine (140) input devices, such as device(s) 110, including determining configuration information such as a device identification (ID) (e.g., unique identifier associated with an input device 110), a physical location (e.g., upstairs bedroom, downstairs living room or the like), a network address (e.g., Internet Protocol (IP) address or the like), a type of input device, and/or the like. The server(s) 112 may receive the configuration information directly from the device 110, via spoken input from the user 10, via a companion application having a graphical user interface (GUI) and/or the like. The server(s) 112 may determine (142) output devices, such as speaker(s) 20, speaker controllers (22) and/or device(s) 110 capable of generating audio, including determining configuration information associated with the output devices. The configuration information may include a device ID, a physical location, a network address, a type of output device, commands/features associated with the output device and/or the like. The server(s) 112 may receive the configuration information directly from the speaker(s) 20, the speaker controller(s) 22 or the device(s) 110, indirectly via the speaker controller(s) 22 (e.g., a speaker controller 22 may send configuration information associated with multiple speakers 20 to the server(s) 112), indirectly via the device(s) 110 (e.g., a device 110 may send configuration information associated with a speaker 20 connected to the device 110), via spoken input from the user 10 and/or via a companion application having a GUI.

The server(s) 112 may determine (144) output zones, such as selecting multiple output devices to collectively generate output audio 30. For example, the server(s) 112 may select first speakers 20 located in a living room as a first zone, select second speakers 20 located in a bedroom as a second zone, and select the first speakers 20 and the second speakers 20 as a third zone. Thus, the user 10 may instruct the server(s) 112 to generate output audio 30 in the first zone (e.g., living room), the second zone (e.g., bedroom) and/or the third zone (e.g., living room and bedroom). The server(s) 112 may determine the output zones via spoken input from the user 10, via a companion application having a GUI and/or the like. The server(s) 112 may configure (146) user preferences of the user 10 based on previous instructions, via spoken input from the user 10, via a companion application having a GUI and/or the like. For example, the user preferences may associate input devices with output devices (e.g., associate a device 110 in the bedroom with the second speakers 20 located in the bedroom), may identify preferred output zones (e.g., when the user 10 doesn't specify an output zone, the server(s) 112 may generate the output audio 30 in every output zone, in a most-frequently selected output zone, or the output zone associated with the device 110 that received the input audio 11), may determine nicknames for input devices, output devices, output zones and/or audio source(s) 40, an account associated with the user 10, or the like.

In some examples, the speaker controller(s) 22 may have preselected configurations of different speaker(s) 20. For example, one or more speaker controller(s) 22 may control a first group of speaker(s) 20 in a first room (e.g., living room) and a second group of speaker(s) 20 in a second room (e.g., kitchen). The server(s) 112 may receive the configuration information directly from individual speaker(s) 20, indirectly from the one or more speaker controller(s) 22 and/or indirectly from a remote device. For example, the one or more speaker controller(s) 22 may be associated with a remote server that includes the configuration information, enabling the user 10 to register, organize and/or control the speaker controller(s) 22 and/or the speaker(s) 20 remotely via the remote server. Thus, the server(s) 112 may receive the configuration information (and, in some examples, additional information) from the remote server.

Additionally or alternatively, the speaker controller(s) 22 and/or the remote server may have preselected output zones associated with the speaker(s) 20. In some examples, the server(s) 112 may receive information about the preselected output zones from the remote server and/or the one or more speaker controller(s) 22, enabling the server(s) 112 to determine the output zones based on the preselected output zones. Thus, the server(s) 112 may include individual speaker(s) 20 in corresponding output zones. In other examples, however, the server(s) 112 may not receive information about the preselected output zones and may not include the individual speaker(s) 20 in the corresponding output zones. Instead, the server(s) 112 may treat the one or more speaker controller(s) 22 as a separate output zone and may send command(s) and/or audio data to the one or more speaker controller(s) 22 to play audio. The server(s) 112 may send the command(s) and/or the audio data to the one or more speaker controller(s) 22 individually (e.g., a first speaker controller 22a corresponds to a first output zone, while a second speaker controller 22b corresponds to a second output zone) and/or collectively (e.g., the one or more speaker controller(s) 22 collectively correspond to a first output zone). In addition, the server(s) 112 may send the command(s) and/or the audio data to the one or more speaker controller(s) 22 directly (e.g., from the server(s) 112 to the one or more speaker controller(s) 22) and/or indirectly via the remote server (e.g., from the server(s) 112 to the remote server and from the remote server to the one or more speaker controller(s) 22).

In some examples, the output zones determined by the server(s) 112 may be different from the preselected output zones associated with the speaker(s) 20. For example, the server(s) 112 may determine to play audio in a first output zone (e.g., living room) and may send a command to the one or more speaker controller(s) 22 to play the audio in the first output zone. However, the one or more speaker controller(s) 22 may group first speaker(s) 20 located in the living room with second speaker(s) 20 located in the kitchen as part of a first preselected output zone (e.g., living room and kitchen). Therefore, instead of playing the audio in the living room as instructed by the server(s) 112, the speaker controller 22 may play the audio in the living room and the kitchen.

During runtime (e.g., after configuration is complete), a user 10 may speak an utterance including a command to a device 110. The device 110 may receive the input audio 11 and convert the audio 11 to audio data. The local device 110 may then send the audio data to the server(s) 112. The server(s) 112 may receive (150) the audio data corresponding to the utterance and may perform (152) Automatic Speech Recognition (ASR) on the audio data to obtain text. (Alternatively the server(s) 112 may perform additional processing on the audio data prior to performing ASR if the audio data 11 is not ASR-ready.)

The server(s) 112 may then determine (154) a command from the text. For example, the server(s) 112 may perform Natural Language Understanding (NLU) processing on the text, which will result in some NLU output data (such as semantic representation of text) that may be used to execute the command. The command may instruct the server(s) 112 to play audio (e.g., music, radio stations or the like) from audio source(s) 40, to stop playing the audio, to increase or decrease a volume of the audio, to mute the audio, to select speaker(s) 20 and/or zones with which to play the audio, or the like. Thus the server may cause a command to be executed using the NLU output. While the server(s) 112 may execute the command itself, it may also pass the NLU output data and/or the command to another component (for example speaker controller(s) 22) to execute the command. Further, some exchange of information between the server(s) 112 and the speaker controller(s) 22 may occur before final execution of the command. For example, server(s) 112 and speaker controller(s) 22 may exchange data needed to execute the command before the command is actually executed, such as identifying speaker(s) 20, configuration information associated with the speaker(s) 20 (e.g., network address or the like), and/or information about the audio source(s) 40 (e.g., the server(s) 112 may instruct the speaker controller(s) 22 to select an audio source 40 and send audio data to the speaker(s) 20).

In some examples, the server(s) 112 may select between user preferences and/or accounts based on the audio data. For example, the server(s) 112 may receive first audio data corresponding to a first user 10a and may identify the first user 10a, determine first user preferences associated with the first user 10a and determine the command based on the first user preferences. Later, the server(s) 112 may receive second audio data corresponding to a second user 10b and may identify the second user 10b, determine second user preferences associated with the second user 10b and determine the command based on the second user preferences. Thus, similar audio data may result in different commands based on the user preferences. For example, the first user preferences may group the speakers in different output zones, may include different audio sources, may have preferred, frequently accessed or default output zones and/or audio sources, and/or may have different preferences in music than the second user preferences.

The server(s) 112 may distinguish between the first user 10a and the second user 10b based on voice signatures, a type of request, and/or other information. For example, the server(s) 112 may identify the first user 10a based on behavior and/or speaker identification. In some examples, the first user 10a may be associated with a first account while the second user 10b is associated with a second account. Thus, the first user 10a may instruct the server(s) 112 to perform a command that is not available to the second user 10b. In a first example, the first account may have greater access and/or control than the second account, such as due to parental controls or the like limiting the second account. Additionally or alternatively, the first account may be associated with services, such as a paid subscription to a music streaming service and/or a video streaming service, that are inaccessible to the second account. Thus, the first user 10a may select from additional commands, audio sources or the like that are not available to the second user 10b.

In some examples, the server(s) 112 may send user information to the speaker controller(s) 22. For example, when receiving audio data corresponding to the first user 10a, the server(s) 112 may send user information associated with the first user 10a to the speaker controller(s) 22. The speaker controller(s) 22 may interpret a command based on the user information, such as selecting output zone(s), speaker(s) 20, audio source(s) or the like. In some examples, the speaker controller(s) 22 (or the remote server discussed above) may have a first account and/or configuration associated with the first user 10a but not with the second user 10*b*. Thus, the first user 10*a* may have access to additional commands and/or audio sources that are unavailable to the second user 10*b*.

In the example illustrated in FIG. 1, the command may instruct the server(s) 112 to generate audio data from a particular audio source and send the audio data to selected output devices. Thus, the server(s) 112 may determine (156) an audio source, such as selecting one of the audio source(s) 40. The audio source(s) 40 may include streaming audio data received from a remote location (e.g., internet radio or the like) and/or audio data from a local device (e.g., AM/FM radio, satellite radio, digital audio data stored on a recordable computer medium or in nonvolatile storage, or the like). The server(s) 112 may determine (158) output devices to which to send audio data. For example, the server(s) 112 may identify speaker(s) 20 and/or output zone(s) specified in the command. If the command did not explicitly specify speaker(s) 20 and/or output zone(s), the server(s) 112 may determine the output devices based on user preferences. For example, the server(s) 112 may select every speaker 20 and/or output zone, may identify a preferred output zone (e.g., living room) based on previously received commands, may identify speaker(s) and/or an output zone associated with the device 110 that received the input audio 11, or the like.

The server(s) 112 may send (160) audio data to the selected output devices. For example, the server(s) 112 may generate a Uniform Resource Identifier (URI) (e.g., Uniform Resource Locator (URL) or the like and send the audio data to the selected output devices using the URI. However, the disclosure is not limited thereto and the server(s) 112 may send the URI to the output devices via speaker controller(s) 22 and/or device(s) 110 connected to the output devices. Additionally or alternatively, the server(s) 112 may instruct the speaker controller(s) 22 to select the audio source 40 and send the audio data to the speaker(s) 20. Thus, instead of the server(s) 112 generating the URI, the speaker controller(s) 22 may generate the URI and/or directly send audio data to the speaker(s) 20.

In addition to audio data associated with the audio source 40 (e.g., music or the like), the server(s) 112 may send audio data associated with the command to the output devices for playback locally to the user 10. For example, the server(s) 112 may receive a command instructing the server(s) 112 to "Play the Rolling Stones." In response to the command, the server(s) 112 may select an audio source 40 and send first audio data to the output devices and the output devices may generate first output audio 30*a* using the first audio data (e.g., play music by the Rolling Stones). In addition, the server(s) 112 may send second audio data to the output devices and the output devices may generate second output audio 30*b* using the second audio data (e.g., voice output stating "Playing the Rolling Stones").

As will be discussed in greater detail below with regard to FIGS. 9A-9B, the server(s) 112 may send the first audio data and the second audio data using a single URI (e.g., simultaneously, such that the user 10 hears the music and the voice output at the same volume, or sequentially, such that the user 10 hears the voice output and then the music) or using multiple URIs (e.g., the first audio data is sent using a first URI and the second audio data is sent using a second URI, such that the user 10 hears the voice output at a first volume and the music at a second, lower, volume). To send the second audio data, the server(s) 112 may maintain a consistent connection (e.g., the second URI is semi-permanent and used for multiple voice outputs) or use temporary connections (e.g., generate a URI specific to the second audio data, such that each voice output is associated with a unique URI).

As illustrated in FIG. 1, the system 100 may enable the user 10 to instruct the server(s) 112 to generate output audio 30 using any combination of the speaker(s) 20. Thus, user 10 may control the output audio 30 (e.g., select an audio source 40, adjust a volume, stop or mute the output audio 30, or the like), control the output devices generating the output audio 30 (e.g., generate output audio 30 in one or more output zones), or the like using spoken commands. In some examples, the device(s) 110 may be located in a house and the system 100 may generate the output audio 30 in one or more rooms of the house. For example, the house may include multiple speaker systems (e.g., speaker(s) 20) that are not connected to the device(s) 110 and the system 100 may control the multiple speaker systems to play music from an audio source in response to a voice command (e.g., input audio 11). Additionally or alternatively, the system 100 may control the multiple speaker systems to play audio corresponding to a video source, such as playing output audio 30 over the speaker(s) 20 while displaying output video on a television. In another example, the device(s) 110 may be a portable device located in a car and the system 100 may generate the output audio 30 using speaker(s) 20 installed (e.g., hardwired) in the car.

Although FIG. 1, and lower figures/discussion, illustrate the operation of the system in a particular order, the steps described may be performed in a different order (as well as certain steps removed or added) without departing from the intent of the disclosure.

Figure 2:
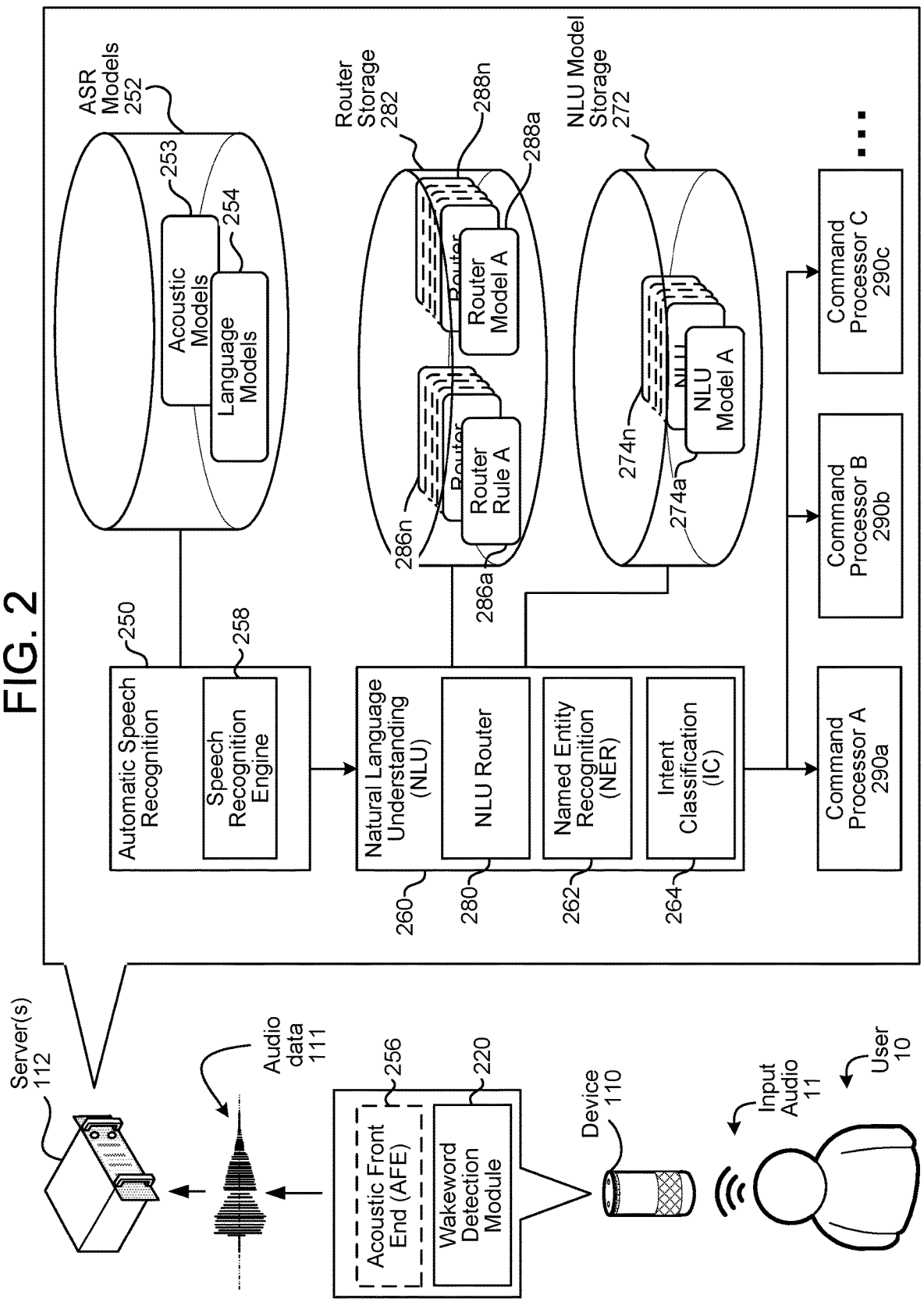
FIG. 2 is a conceptual diagram of speech processing according to embodiments of the present disclosure.

Further details of NLU are explained below, following a discussion of the overall speech processing system of FIG. 2. The NLU as described in reference to FIG. 1 may be operated by a system that incorporates various speech processing components as described in FIG. 2. FIG. 2 is a conceptual diagram of how a spoken utterance is traditionally processed, allowing a system to capture and execute commands spoken by a user, such as spoken commands that may follow a wakeword. The various components illustrated may be located on a same or different physical devices. Communication between various components illustrated in FIG. 2 may occur directly or across a network 199. An audio capture component, such as a microphone of device 110, captures audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server(s) 112 that includes an ASR module 250. The audio data 111 may be output from an acoustic front end (AFE) 256 located on the device 110 prior to transmission. Or the audio data 111 may be in a different form for processing by a remote AFE 256.

The wakeword detection module 220 works in conjunction with other components of the device, for example a microphone (not pictured) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 112 for speech processing. Audio data corresponding to that audio may be sent to a server(s) 112 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending. Further, a local device 110 may "wake" upon detection of speech/spoken audio above a threshold, as described herein. Upon receipt by the server(s) 112, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model knowledge base (ASR Models Storage 252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include a speech recognition engine 258. The speech recognition engine 258 compares input audio data (such as audio data created by an AFE 256 and sent to the server(s) 112) with acoustic models 253, language models 254, and other data models and information for recognizing the speech conveyed in the audio data. The AFE may reduce noise in the audio data and divide the digitized audio data into frames representing a time intervals for which the AFE determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process audio data with reference to information stored in speech/model storage (252). Alternatively, post front-end processed data (such as feature vectors) may be received by the device executing ASR processing from another source besides the internal AFE. For example, the device 110 may process audio data into feature vectors and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server(s) 112, for natural language understanding (NLU) processing, such as conversion of the text into commands for execution, either by the device 110, by the server(s) 112, or by another device (such as a server running a specific application like a search engine, etc.).

The device performing NLU processing 260 (e.g., server(s) 112) may include various components, including potentially dedicated processor(s), memory, storage, etc. A device configured for NLU processing may include one or more named entity recognition (NER) modules 262, one or more intent classification (IC) modules 264, one or more result ranking and distribution modules (not shown), and one or more knowledge bases (not shown). The NLU process may also utilize gazetteer information stored in entity library storage (not shown). The gazetteer information may be used for entity resolution, for example matching ASR results with different entities (such as song titles, contact names, etc.). Gazetteers may be linked to users (for example a particular gazetteer may be associated with a specific user's music collection), may be linked to certain domains (such as shopping), may be linked to a specific application, or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning or passes an indication of that meaning (such as semantically tagged text or the like) to a different component (such as command processor 290) for execution. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list output by ASR module 250), the NLU may process all N outputs to obtain NLU results. The NLU process may be configured to parse and tag the ASR results to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server(s) 112 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

Thus, as part of the NLU pipeline the NLU module 260 may include an NLU router 280. The NLU router 280, further discussed below, may be configured to operate on the utterance text output by the ASR component 250. The NLU router 280 may also be configured to operate on other data that may assist in routing NLU requests, such as geographic data, time data, user profile information, user history, etc. The NLU router 280 takes its input, such as the utterance text, and associates an application with the text and/or the utterance. To do this, the router may use information in router storage 282. For example, the NLU router 280 may use one or more router rules 286 to parse the text to identify, for example, portions of the text in which an application name or function may be expected. Thus the NLU router 280 may identify text that identifies the desired application and my associate the desired application with the text. The NLU module 260 may then use the associated application to identify an NLU model 274 to use during NLU processing and may also use the associated application identify a destination command processor 290 of the application to send the NLU output to. Thus the NLU router may "route" the text to the desired application.

The NLU router 280 may also use trained models 288 to associate an application to a command/text. The trained models 288 may include trained machine learning models that can also identify a desired application. The trained models 288 may be used in addition to rules 286 as a way of supplementing the rules 286 if they are unable to determine a desired application with sufficient confidence. Alternatively, the models 288 may be used on their own in particular configurations.

In some examples, once an application is associated to the text, the NLU module 260 may identify in NLU model storage 272 an NLU model 274 corresponding to the particular application. For example, if application B is associated with the text by the NLU router, NLU model B 274*b* may be identified by the NLU module 260. The application specific NLU model may then be used by the NLU module 260 to perform NLU processing, such as NER, IC, semantic tagging, or other tasks such as those described below.

The name entity recognition module 262 receives a query in the form of ASR results and attempts to identify relevant grammars and lexical information that may be used to construe meaning. To do so, a name entity recognition module 262 may begin by identifying potential domains that may relate to the received query or may use the associated application determined by the NLU router 280. An NLU knowledge base may include a database of devices identifying domains associated with specific devices. For example, the device 110 may be associated with domains for different applications such as music, telephony, calendaring, contact lists, and device-specific communications. In addition, the entity library may include database entries about specific services on a specific device, either indexed by Application ID, Device ID, User ID, or Household ID, or some other indicator.

A domain may represent a discrete set of activities having a common theme, such as "shopping", "music", "calendaring", etc. A domain may also be specific to a particular application. Each domain may be associated with a particular language model and/or grammar database, a particular set of intents/actions, and a particular personalized lexicon. Each gazetteer may include domain-indexed lexical information associated with a particular user and/or device. For example, one gazetteer may include domain-index lexical information. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain may be associated with a database of words linked to intents. For example, a music intent database may link words and phrases such as "quiet," "volume off," and "mute" to a "mute" intent. The IC module 264 identifies potential intents for each identified domain by comparing words in the query to the words and phrases in the intents database.

In order to generate a particular interpreted response, the NER 262 applies the grammar models and lexical information associated with the respective domain. Each grammar model includes the names of entities (i.e., nouns) commonly found in speech about the particular domain (i.e., generic terms), whereas the lexical information from the gazetteer is personalized to the user(s), device and/or the application. For instance, a grammar model associated with the shopping domain may include a database of words commonly used when people discuss shopping.

The intents identified by the IC module 264 are linked to domain-specific grammar frameworks with "slots" or "fields" to be filled. For example, if "play music" is an identified intent, a grammar framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 262 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 262 then searches the corresponding fields in the domain-specific and personalized lexicon(s), attempting to match words and phrases in the query tagged as a grammatical object or object modifier with those identified in the database(s).

This process may include semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like. Semantic tagging may be configured in a different manner depending on the application invoked by the command. Thus certain semantic tags may be specific to a particular application.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 262 may search the database of generic words associated with the domain (in the NLU's knowledge base). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server(s) 112 as part of system 100, or may be located on some other component. For example, multiple command processors (290a, 290b, 290c . . . ) may be available to system 100. The destination command processor 290 may be determined based on the NLU output and/or user preferences. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command. The destination command processor 290 may also be determined based on the intended application determined by the NLU router 280. For example, if the NLU router 280 determines that an input command is associated with application A, in addition to invoking NLU model A, the system may associate the input command with application A so that the NLU results are sent to a command processor associated with application A (for example, command processor A, 290a). Thus, each command processor may be associated with a particular application, in a manner similar to each NLU model being associated with a particular application.

As discussed above, command processor(s) 290 may be located on the server(s) 112 and/or the device(s) 110. Thus, the system 100 may receive the input audio 11 using the device 110. may send the corresponding audio data 111 to the server(s) 112 and the server(s) 112 may send the NLU output to a first command processor 290a located on the device 110 and/or to a second command processor 290b located on the server(s) 112. Additionally or alternatively, command processor(s) 290 may be located separate from the server(s) 112, for example on the speaker controller(s) 22 without departing from the disclosure. For example, the system 100 may send the NLU output (or an instruction generated from the NLU output) to a third command processor 290c located on a first speaker controller 22.

In some examples, third party developers may develop applications configured to operate in an input-limited environment (e.g., a system controlled using voice input). Thus, in addition to identifying the command processor 290, the system 100 may act as an intermediary between the command processor 290 and the user 10. For example, the system 100 may receive the input audio 11 from the user 10 and may determine input data (e.g., NLU output) to be sent to a component associated with the application (such as a particular command processor 290). In response to the input data, the application may generate output data to be sent through the system back to the user. For example, the application may generate audio data to be played back to the user 10 via the system 100 (e.g., the device 110 and/or the speaker(s) 20). In some examples, the application (e.g., command processor 290) may send commands to and/or control the speaker controller(s) 22 and/or the speaker(s) 20. In another example the application may generate text data that may be processed using text-to-speech operations by the server(s) 112 to output audio data through the local device 110 to the user 10.

Figure 3A:
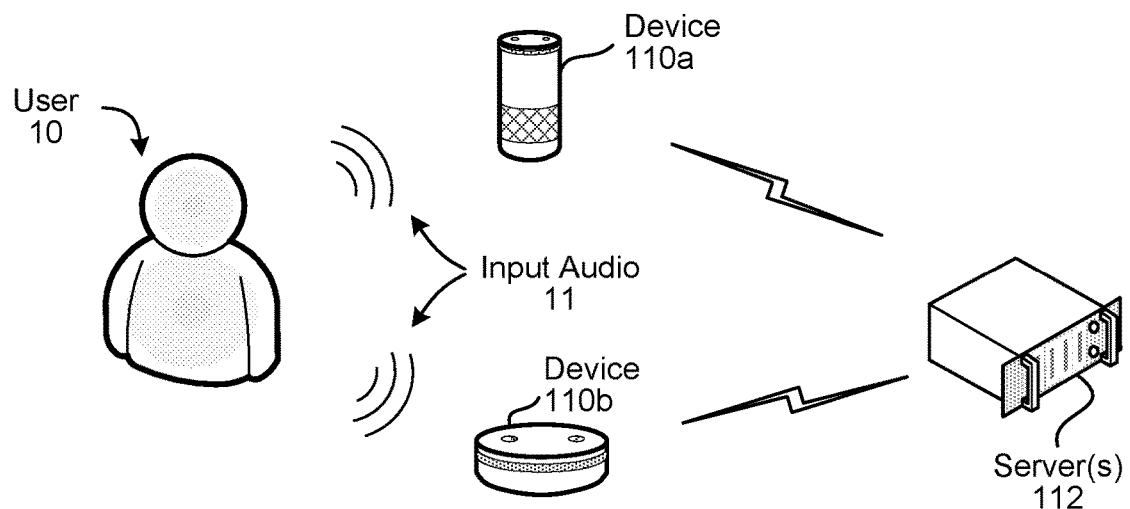
FIGS. 3A-3B illustrate examples of input devices according to embodiments of the present disclosure.
Figure 3B:
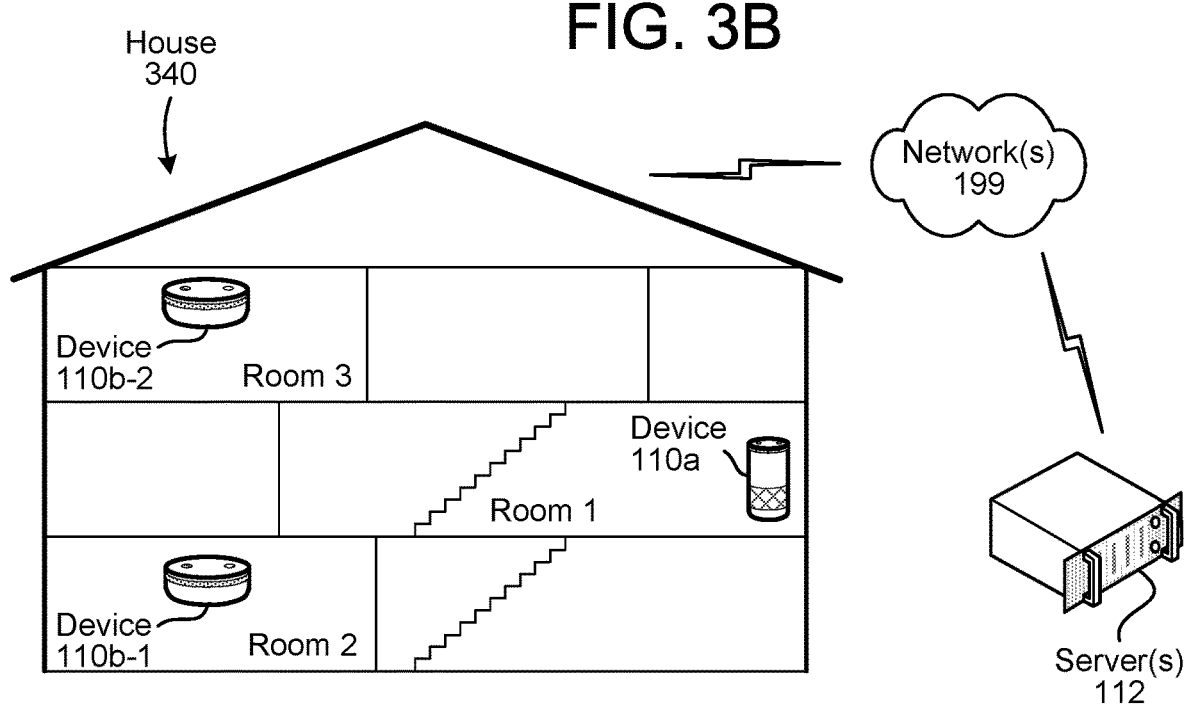

FIGS. 3A-3B illustrate examples of input devices according to embodiments of the present disclosure. As illustrated in FIG. 3A, the server(s) 112 may receive input audio 11 from a first device 110a and/or a second device 110b. To capture the input audio 11, the first device 110a and the second device 110b may include microphone arrays. In addition, the first device 110a and the second device 110b may include one or more speakers to generate voice output to the user 10. For example, the server(s) 112 may receive the audio data corresponding to the input audio 11 from the device 110a/110b, may determine a command included in the audio data, may execute the command and may send a voice output to the device 110a/110b to indicate to the user 10 that the command was executed. Thus, when the user 10 instructs the server(s) 112 to "Play the Rolling Stones," the device 110a/110b may generate voice output stating "Playing the Rolling Stones." While the first device 110a and the second device 110b may both include speakers, the speakers included in the first device 110a may be of higher quality than the speakers included in the second device 110b. Additionally or alternatively, the second device 110b may not include speakers. As illustrated in FIG. 3B, a house 340 may include device 110a in Room 1, device 110b-1 in Room 2 and device 110b-2 in Room 3, which are connected to the server(s) 112 via the network(s) 199. Thus, the server(s) 112 may receive input audio 11 via the devices 110 from the user 10 in Room 1, Room 2 and/or Room 3 of the house 340.

Figure 4A:
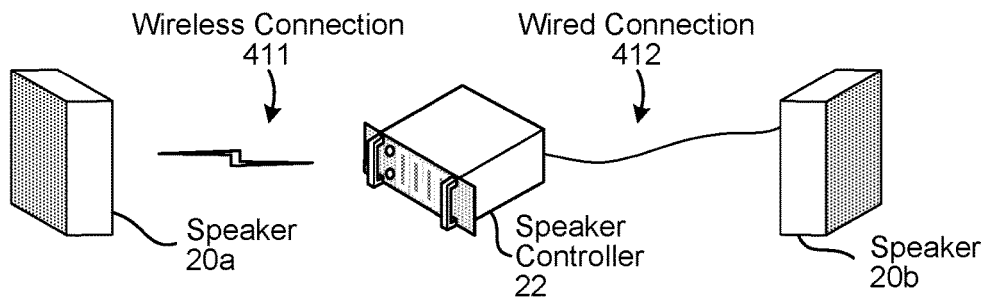

FIGS. 4A-4D illustrate examples of generating output audio according to embodiments of the present disclosure. As illustrated in FIG. 4A, a speaker controller 22 may communicate with (e.g., send audio data to) a first speaker 20a using a wireless connection 411 (e.g., Wifi, Bluetooth or the like) and/or may communicate with (e.g., send audio data to) a second speaker 20b using a wired connection 412 (e.g., audio line out or the like). The speaker controller 22 may communicate with a single speaker 20 or a plurality of speakers 20 using the wireless connection 411 and/or the wired connection 412.

Figure 4B:
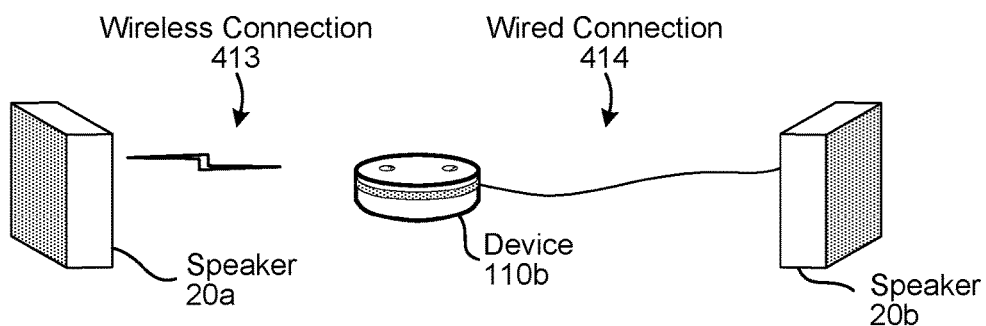

As illustrated in FIG. 4B, in some examples a device 110 (e.g., device 110b) may communicate with a first speaker 20a using a wireless connection 413 (e.g., WiFi, Bluetooth or the like) and/or may communicate with a second speaker 20b using a wired connection 414 (e.g., audio line out or the like). For example, the device 110 may be paired with one or more speakers 20 using the wireless connection 413 and/or the wired connection 414.

Figure 4C:
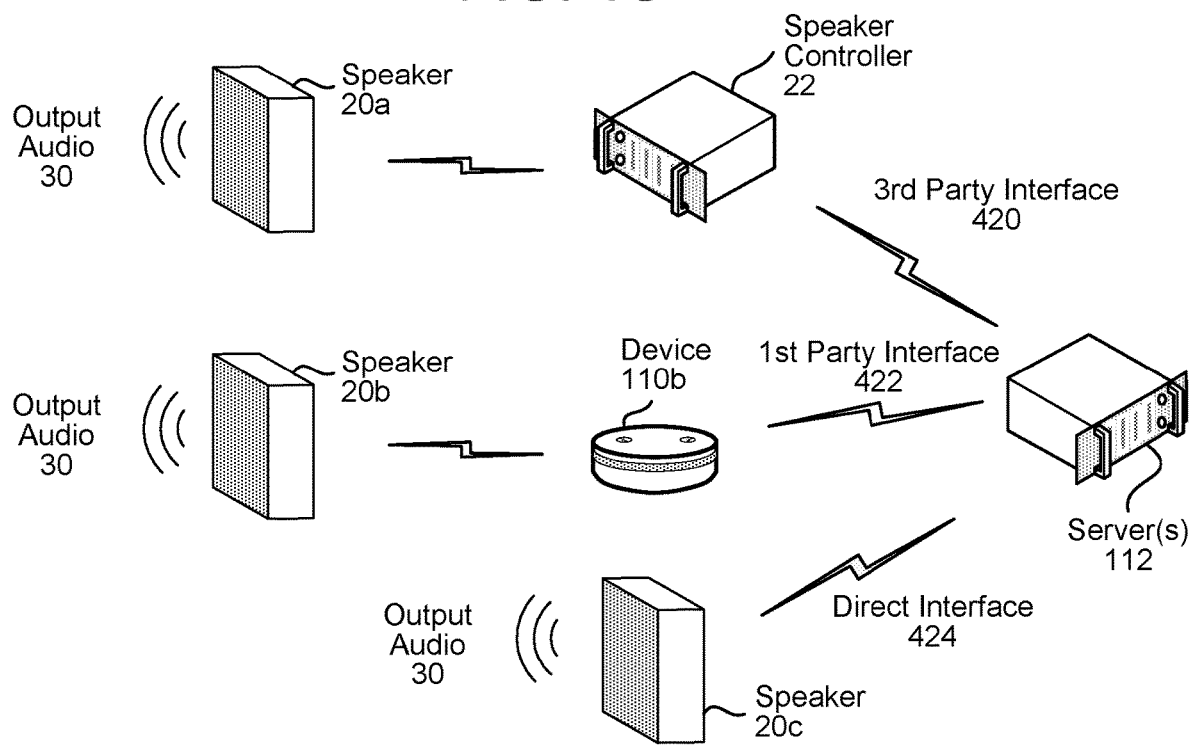

As illustrated in FIG. 4C, the server(s) 112 may communicate with a first speaker 20a via the speaker controller 22 using a third party interface 420, may communicate with a second speaker 20b via the device 110b using a first party interface 422 and/or may communicate directly with a third speaker 20c using a direct interface 424. Thus, the server(s) 112 may instruct the speakers 20a-20c to generate output audio 30 using the third party interface 420, the first party interface 422 and/or the direct interface 424.

As discussed above, the server(s) 112 may send audio data from audio source(s) 40, which may include streaming audio data received from a remote location (e.g., internet radio or the like) and/or audio data from a local device (e.g., AM/FM radio, satellite radio, digital audio data stored on a recordable computer medium or in nonvolatile storage, or the like). For example, the server(s) 112 may send streaming audio data to the speaker controller 22, the device 110b and/or the speaker 20c. In some examples, the server(s) 112 may instruct the speaker controller 22 to play audio from the audio source(s) 40.

As illustrated in FIG. 4D, a house 440 may include input devices, such as device 110a in Room 1, device 110c (e.g., television) in Room 1, device 110b-1 in Room 2 and device 110b-2 in Room 3, which are connected to the server(s) 112 via the network(s) 199. Thus, the server(s) 112 may receive input audio 11 via the devices 110 from the user 10 in Room 1, Room 2 and/or Room 3 of the house 440. In addition, the house 440 may include output devices, such as a speaker controller 22 in Room 1, speaker 20a-1 and speaker 20a-2 in Room 1, device 110c (e.g., television) in Room 1, speaker 20b in Room 3 and speaker 20c in Room 4, which are connected to the server(s) 112 via the network(s) 199. Thus, the server(s) 112 may generate output audio 30 using the speakers 20a-1/20a-2/20b/20c and/or device 110c in Room 1, Room 3 and/or Room 4 of the house 440. As indicated above, the device 110c (e.g., television) may act as an input device (e.g., include a microphone array configured to receive the input audio 11) and as an output device (e.g., include speakers configured to generate the output audio 30). While devices 110a, 110b-1 and 110b-2 are included as input devices, they may generate output audio 30 without departing from the present disclosure.

In order for the server(s) 112 to receive information from the speaker(s) 20/speaker controller(s) 22 and/or send information or commands to the speaker(s) 20/speaker controller(s) 22, the server(s) 112 may use application programming interface(s) (APIs) configured to exchange information and/or translate commands between the server(s) 112 and the speaker(s) 20/speaker controller(s) 22. Thus, the APIs may be used for enumerating speakers, output zones and other configuration information and/or communicating streaming URLs to play output audio on the speaker(s) 20/speaker controller(s) 22. For example, the server(s) 112 may request configuration information from the speaker(s) 20/speaker controller(s) 22, such as a device ID, a network address, output zones, commands/features associated with the speaker(s) 20/speaker controller(s) 22 and/or other information, and the APIs may translate the request from a first format (associated with the server(s) 112) into a second format (associated with the speaker(s) 20/speaker controller 22). In addition, the APIs may translate a response to the request from the second format to the first format. Similarly, the APIs may translate a command (e.g., play audio, increase volume, decrease volume, select source, etc.) from the first format to the second format so that the server(s) 112 may communicate instructions to the speaker(s) 20/speaker controller 22. For example, the APIs may determine that a first command (e.g., volume up command) in the first format, which is associated with the device 110 and/or server(s) 112, corresponds to a second command (e.g., command 11) in the second format, which is associated with the speaker(s) 20 and/or the speaker controller(s) 22.

Thus, the APIs may exchange commands and/or data between the device(s) 110/server(s) 112 and the speaker(s) 20/speaker controller(s) 22 so that first applications running on the device(s) 110/server(s) 112 may communicate with second applications running on the speaker(s) 20/speaker controller(s) 22. The APIs may include a set of routines, protocols and tools known to one of skill in the art that includes operations (e.g., commands), inputs, outputs and/or other functionalities associated with the first applications and/or the second applications. As used herein, when the device(s) 110/server(s) 112 send commands/information to the speaker(s) 20/speaker controller 22 and/or the speaker(s) 20/speaker controller(s) 22 send commands/information to the device(s) 110/server(s) 112, the commands/information may be translated or requested using the APIs.

In some examples, instead of generating a first command in the first format, which is associated with the device 110 and/or server(s) 112, and translating the first command to a second command in the second format, which is associated with the speaker(s) 20 and/or the speaker controller(s) 22, the system 100 may control the speaker(s) 20 and/or the speaker controller(s) 22 using an application, as discussed above with regard to FIG. 2. For example, the application may receive inputs (e.g., audio input data, NLU output or the like) from the system 100 and may generate outputs (e.g., commands) in the second format.

Figures 5A, 5B:
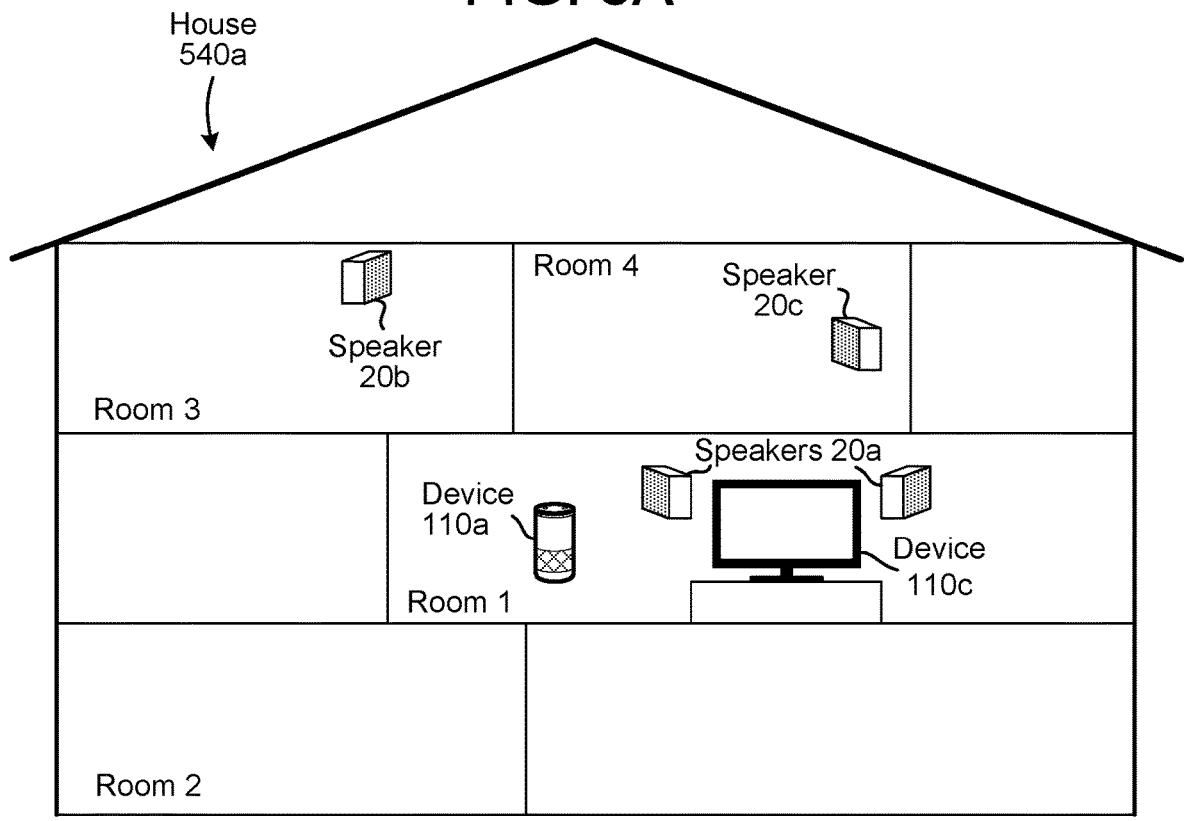

FIGS. 5A-5H illustrate examples of configurations for input devices and output devices according to embodiments of the present disclosure. FIG. 5A illustrates output devices located in house 540a, such as device 110a in Room 1, speaker 20a-1 and speaker 20a-2 in Room 1, device 110c (e.g., television) in Room 1, speaker 20b in Room 3 and speaker 20c in Room 4. The server(s) 112 may receive configuration information such as a device identification (ID) (e.g., unique identifier), a physical location (e.g., upstairs bedroom, downstairs living room or the like), a network address (e.g., Internet Protocol (IP) address or the like), a type of output device, commands/features associated with the output device and/or the like. The server(s) 112 may receive the configuration information directly from the device 110 and/or speakers 20, indirectly via the speaker controller(s) 22 (e.g., a speaker controller 22 may send configuration information associated with speakers 20a to the server(s) 112), indirectly via the device(s) 110 (e.g., device 110b-2 may send configuration information associated with speaker 20b connected to the device 110b-2), via spoken input from the user 10, via a companion application having a graphical user interface (GUI) and/or the like.

FIG. 5B illustrates an example of an interface 510 illustrating the output devices and corresponding physical locations. The user 10 may use the interface 510 to select multiple output devices and/or perform other functionality. While FIG. 5B illustrates the interface 510 as a graphical user interface (GUI), the disclosure is not limited thereto and the user 10 may communicate with the server(s) 112 via spoken commands and/or voice outputs without departing from the disclosure.

Figure 5D:
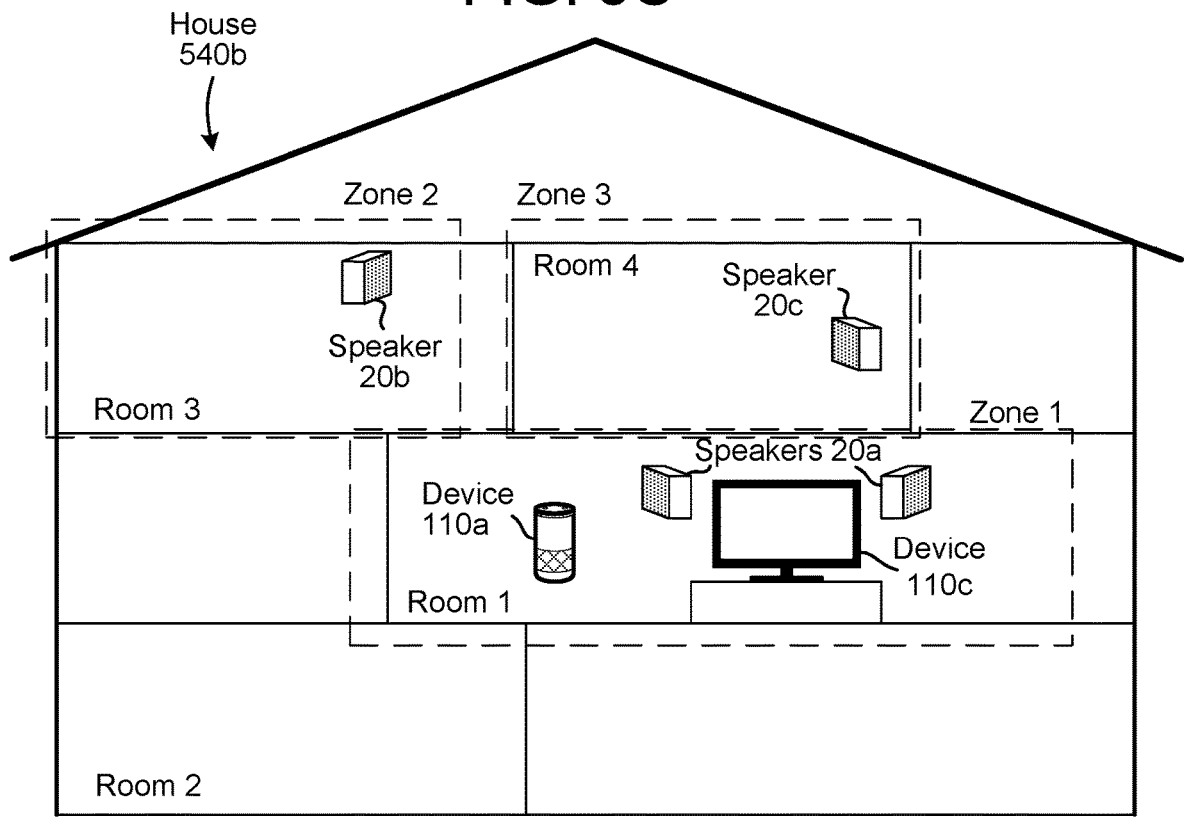

The user 10 and/or the server(s) 112 may select output devices and generate output zones, as illustrated in FIG. 5C. For example, a house 540b illustrated in FIG. 5C include the device 110a, the device 110c and the speakers 20a in Zone 1, speaker 20b in Zone 2 and speaker 20c in Zone 4, as illustrated by interface 520 shown in FIG. 5D. As discussed above, while FIG. 5D illustrates the interface 520 as a GUI, the disclosure is not limited thereto and the user 10 may communicate with the server(s) 112 via spoken commands and/or voice outputs without departing from the disclosure. While FIGS. 5C-5D illustrate the output zones corresponding to individual rooms, the disclosure is not limited thereto and an output zone may include output devices in multiple rooms. Additionally or alternatively, while FIGS. 5C-5D illustrate every output device being associated with a single output zone, the disclosure is not limited thereto and some output devices may not be associated with an output zone and/or may be associated with multiple output zones. For example Zone 5 (not shown) may include Zone 1, Zone 2, Zone 3 and Zone 4 and may be used to generate output audio 30 all over the house 540b.

FIG. 5E illustrates input devices located in house 540c, such as device 110a in Room 1, device 110c (e.g., television) in Room 1, device 110b-1 in Room 2 and device 110b-2 in Room 3. The server(s) 112 may receive configuration information such as a device identification (ID) (e.g., unique identifier), a physical location (e.g., upstairs bedroom, downstairs living room or the like), a network address (e.g., Internet Protocol (IP) address or the like), a type of input device and/or the like. The server(s) 112 may receive the configuration information directly from the devices 110, via spoken input from the user 10, via a companion application having a GUI and/or the like.

FIG. 5F illustrates an example of an interface 530 illustrating the input devices and corresponding physical locations. The user 10 may use the interface 530 to associate the input devices with output zones and/or perform other functionality. While FIG. 5F illustrates the interface 530 as a GUI, the disclosure is not limited thereto and the user 10 may communicate with the server(s) 112 via spoken commands and/or voice outputs without departing from the disclosure.

Figures 5G, 5H:
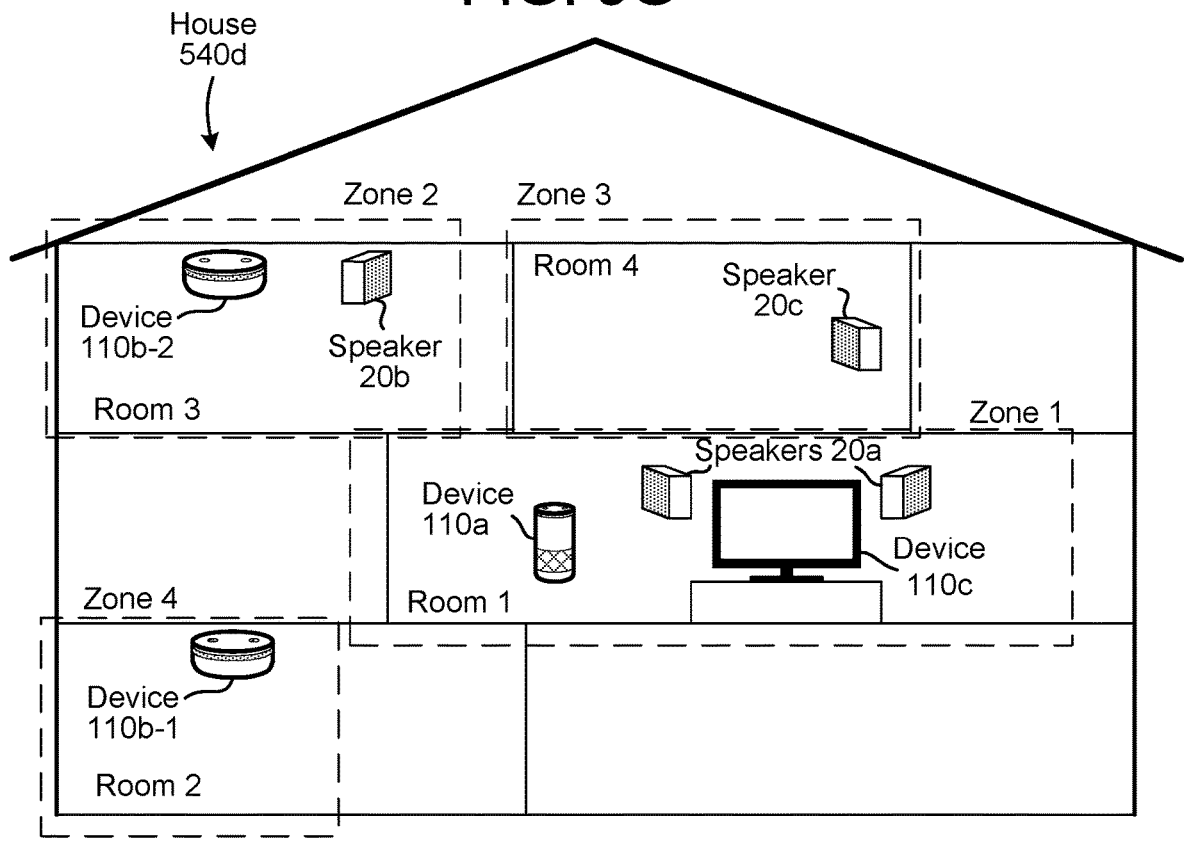

FIG. 5G illustrates input devices, output devices and corresponding input/output associations in house 540d. FIG. 5H illustrates an example of an interface 550 illustrating the input devices and output devices associated with each output zone. For example, Zone 1 includes device 110a, device 110c, and speakers 20a, Zone 2 includes device 110b-2 and speaker 20b, Zone 3 includes speaker 20c and Zone 4 includes device 110b-1. As illustrated in FIGS. 5G-5H, an output zone may be associated with input devices and output devices (e.g., Zone 1 and Zone 2), with output devices (e.g., Zone 3) and/or with input devices (e.g., Zone 4) without departing from the disclosure. While FIGS. 5G-5H illustrate the output zones corresponding to individual rooms, the disclosure is not limited thereto and an output zone may include input devices and/or output devices in multiple rooms. Additionally or alternatively, while FIGS. 5G-5H illustrate every input device and/or output device associated with a single output zone, the disclosure is not limited thereto and some input devices/output devices may not be associated with an output zone and/or may be associated with multiple output zones. For example Zone 5 (not shown) may include Zone 1, Zone 2, Zone 3 and Zone 4 and may be used to generate output audio 30 all over the house 540d.

Figure 6:
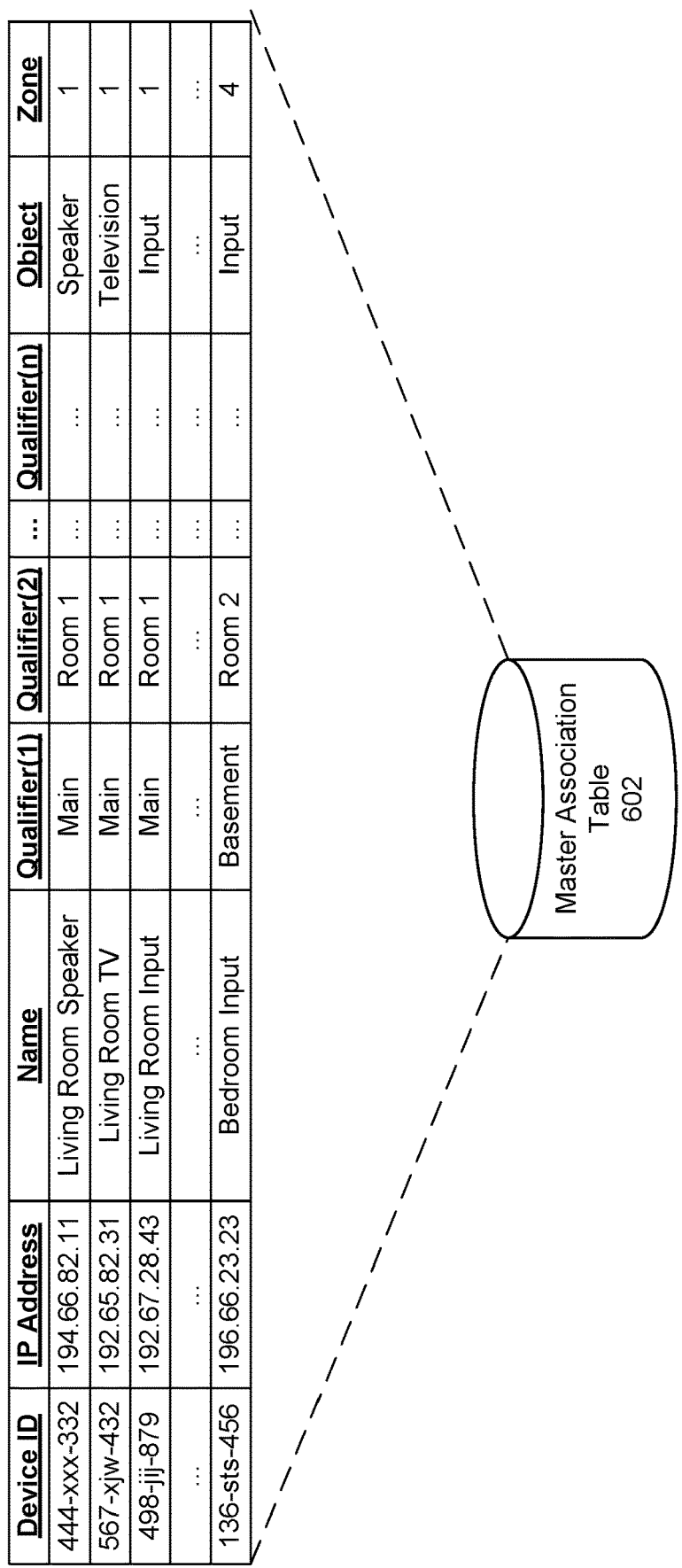
FIG. 6 illustrates an example of a master association table according to embodiments of the present disclosure.

FIG. 6 illustrates an example of a master association table according to embodiments of the present disclosure. As illustrated in FIG. 6, a master association table 602 may include data regarding input devices, output devices, output zones, input/output associations and other information. The master association table 602 may be located with server(s) 112 or located elsewhere in the system 100. A variety of data may be stored in master association table 602. For present illustration, as shown in FIG. 6, the master association table 602 may include a device identifier (ID) and internet protocol (IP) address information for different devices as well as names by which the devices may be referred to by a user. Further qualifiers describing the devices may also be listed along with a description of the type of object of the device and an output zone.

In some examples, the master association table 602 may include information associated with individual users, households, accounts, etc. that interact with the system. For example, the master association table 602 may be part of a user profile and the input devices/output devices may be linked to a user identification or the like. Thus, the server(s) 112 may select from audio sources 40 that are available to the user profile and/or input devices/output devices associated with the user profile. As discussed above with regard to FIG. 1, the server(s) 112 may distinguish between users 10 based on voice signatures, type of requests and/or other information, performing speaker identification, behavior identification or the like. The users 10 may be associated with individual accounts and/or user preferences, enabling the system 100 to interpret commands differently and/or perform additional functionality based on the user 10 speaking.

Using the master association table 602, the system 100 may generate audio using one or more output devices, such as the device 110a, the speaker(s) 20, the speaker controller(s) 22 or the like. Thus, a single input may control multiple output devices. In some examples, a device may be associated with multiple entries in the master association table 602. For example, the device 110a may be included in the master association table 602 as an input device (e.g., microphone) and as an output device (e.g., speaker).

Figure 7B:
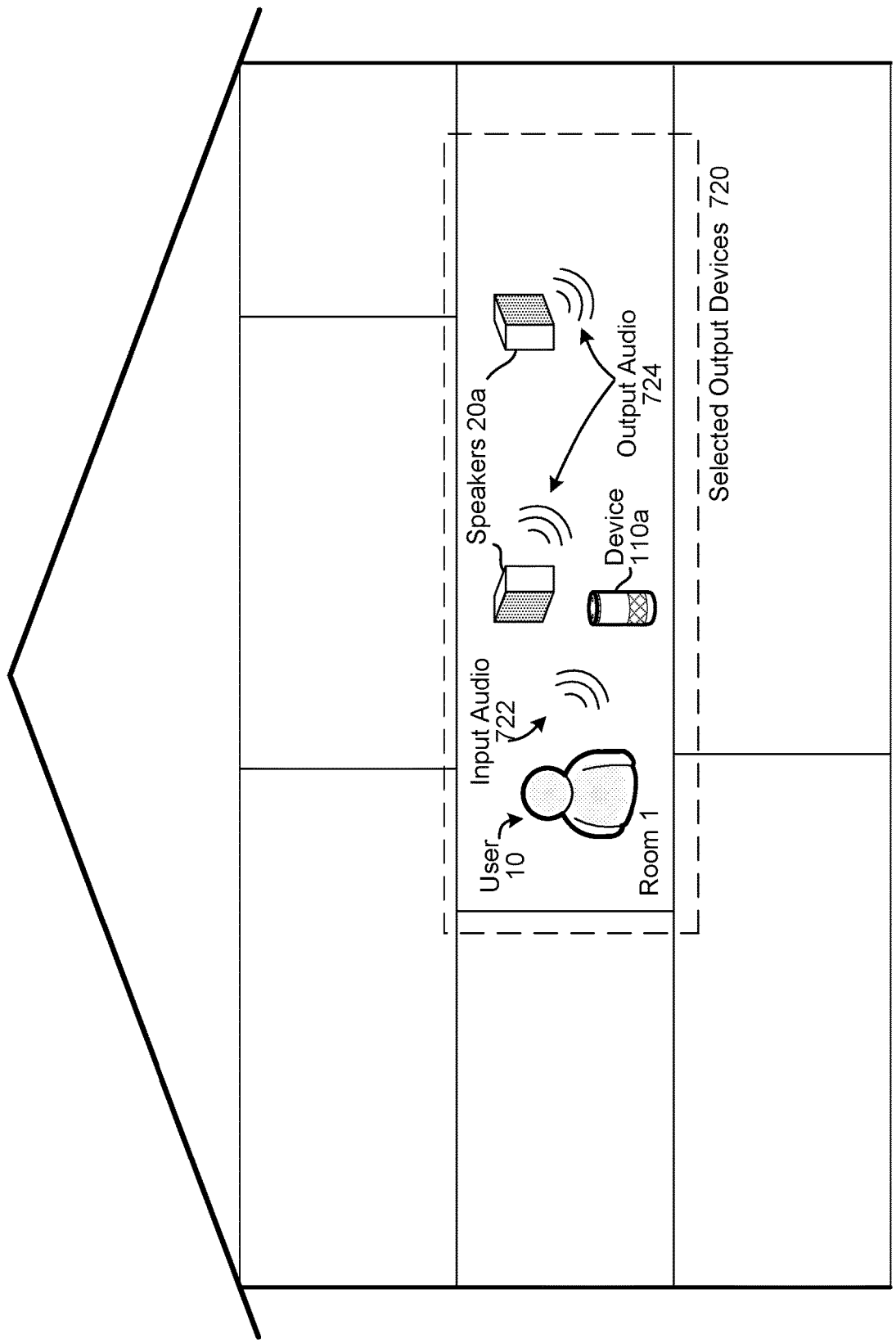

FIGS. 7A-7D illustrate examples of controlling output devices according to embodiments of the present disclosure. As illustrated in FIG. 7A, a device 110a may receive input audio 712 from user 10 in Room 1 and the server(s) 112 may determine that selected output devices 710 include speakers 20a in Room 1, speaker 20b in Room 3 and speaker 20c in Room 4. Thus, the server(s) 112 may send audio data to the selected output devices 710 and the selected output devices 710 may generate output audio 714 in multiple rooms (e.g., Room 1, Room 3 and Room 4).

As illustrated in FIG. 7B, the device 110a may receive input audio 722 from user 10 in Room 1 and the server(s) 112 may determine that selected output devices 720 include speakers 20a in Room 1. Thus, the server(s) 112 may send audio data to the selected output devices 720 and the selected output devices 720 may generate output audio 724 in the same output zone as the input audio 722.

As illustrated in FIG. 7C, a device 110b-2 may receive input audio 732 from user 10 in Room 3 and the server(s) 112 may determine that selected output devices 730 include speaker 20b in Room 3. Thus, the server(s) 112 may send audio data to the selected output devices 730 and may generate output audio 734 using the speaker 20b connected to the device 110b-2 that received the input audio 732.

Figure 7D:
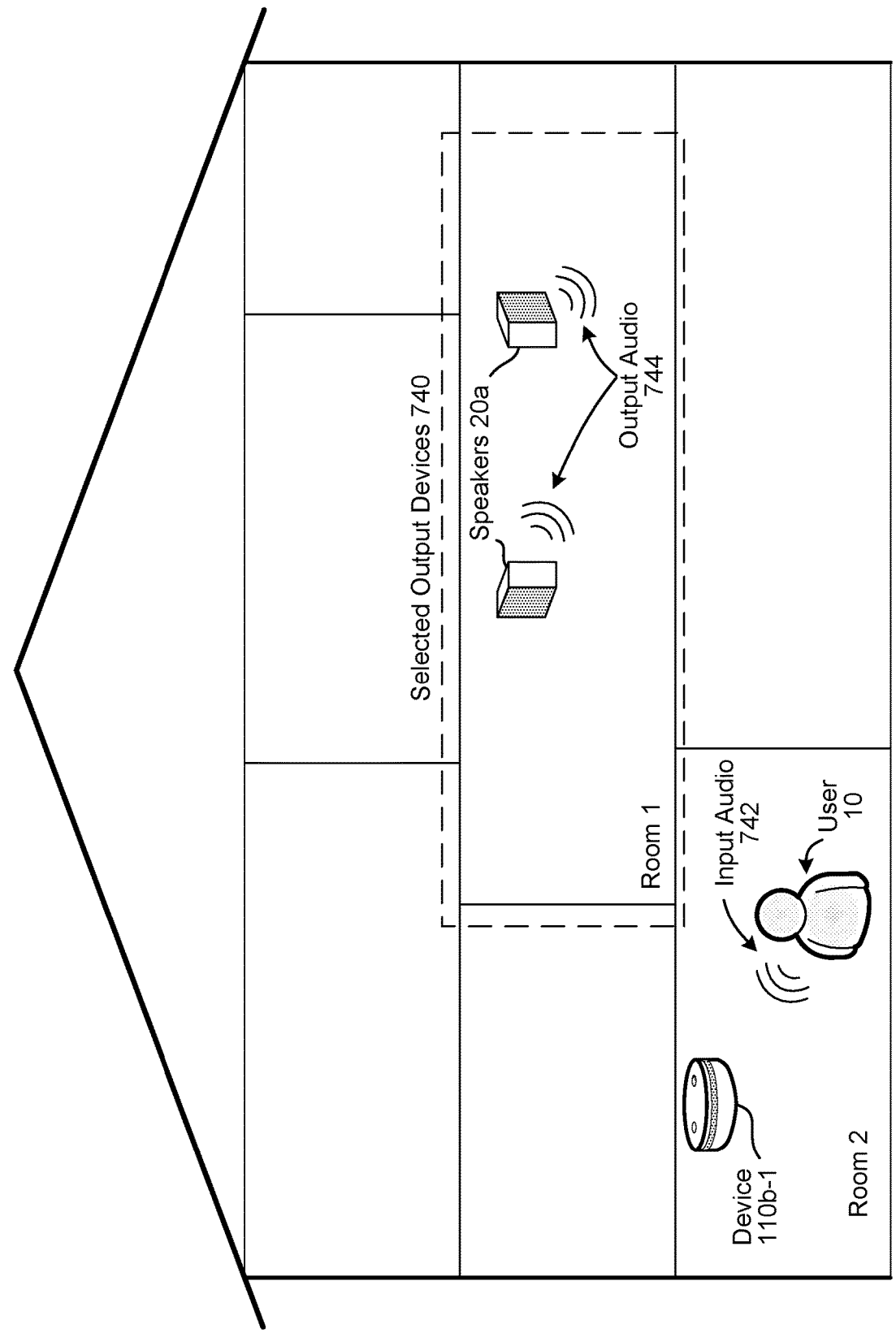

As illustrated in FIG. 7D, a device 110b-2 may receive input audio 742 from user 10 in Room 2 and the server(s) 112 may determine that selected output devices 740 include speakers 20a in Room 1. Thus, the server(s) 112 may send audio data to the selected output devices 740 and the selected output devices 740 may generate output audio 744 in a different output zone than where the input audio 742 was received.

FIGS. 8A-8E illustrate communications and operations among devices to generate and control output audio according to embodiments of the present disclosure. FIG. 8A illustrates an example of the server(s) 112 sending audio data to speaker(s) 20 via a device 110b. As illustrated in FIG. 8A, a device 110 may receive (810) input audio corresponding to a spoken utterance, such as a command to play music. The device 110 may send (812) audio data corresponding to the input audio to the server(s) 112. As discussed above in reference to FIG. 1, the server(s) 112 may then perform (814) ASR on the audio data to obtain text and may determine (816) a command from the text. For example, the server(s) 112 may perform Natural Language Understanding (NLU) processing on the text, which will result in some NLU output data (such as semantic representation of text) that may be used to execute the command. The command may instruct the server(s) 112 to play audio (e.g., music, radio stations or the like) from audio source(s) 40, to stop playing the audio, to increase or decrease a volume of the audio, to mute the audio, to select speaker(s) 20 and/or zones with which to play the audio, or the like. Thus the server(s) 112 may cause a command to be executed using the NLU output.

In the example illustrated in FIG. 8A, the command may instruct the server(s) 112 to play output audio. Therefore, the server(s) 112 may determine (818) an audio source, such as selecting one of the audio source(s) 40. The audio source(s) 40 may include streaming audio data received from a remote location (e.g., internet radio or the like) and/or audio data from a local device (e.g., AM/FM radio, satellite radio, digital audio data stored on a recordable computer medium or in nonvolatile storage, or the like). The server(s) 112 may generate (820) a URL for the audio source and may send (822) the URL to the device 110b. The device 110b may stream (824) audio data using the URL and may send (826) the audio data to the speaker(s) 20. The speaker(s) 20 may play (828) output audio using the audio data. While FIG. 8A illustrates the device 110b streaming the audio data using the URL and sending the audio data to the speaker(s) 20, the disclosure is not limited thereto and the device 110b may send the URL to the speaker(s) 20 and the speaker(s) 20 may stream the audio data using the URL.

In addition to the audio data associated with the audio source 40 (e.g., music or the like), the server(s) 112 may send audio data associated with the command to the speaker(s) 20. For example, the server(s) 112 may receive a command instructing the server(s) 112 to "Play the Rolling Stones." In response to the command, the server(s) 112 may select an audio source 40 and send first audio data to speaker(s) 20 and the speaker(s) 20 may play first audio using the first audio data (e.g., play music by the Rolling Stones). In addition, the server(s) 112 may send second audio data to the speaker(s) 20 and the speaker(s) 20 may play second audio second using the second audio data (e.g., voice output stating "Playing the Rolling Stones").

FIG. 8B illustrates an example of the server(s) 112 sending audio data to speaker(s) 20 directly. As illustrated in FIG. 8B, the system 100 may perform steps 810-820 as described with regard to FIG. 8A. However, the server(s) 112 may send (830) the URL directly to the speaker(s) 20 and the speaker(s) 20 may play (832) the output audio. For example, the speaker(s) 20 may stream audio data using the URL. As discussed above, the server(s) 112 may send audio data associated with the command to the speaker 20 in addition to the audio data associated with the audio source 40 (e.g., music or the like).

FIG. 8C illustrates an example of the server(s) 112 sending audio data to speaker(s) 20 via speaker controller 22. As illustrated in FIG. 8C, the system 100 may perform steps 810-820 as described with regard to FIG. 8A. However, the server(s) 112 may send (840) the URL to the speaker controller 22. The speaker controller 22 may stream (842) audio data using the URL and may send (844) the audio data to the speaker(s) 20. The speaker(s) 20 may play (846) the output audio using the audio data. As discussed above, the server(s) 112 may send audio data associated with the command to the speaker 20 in addition to the audio data associated with the audio source 40 (e.g., music or the like).

While FIGS. 8A-8C illustrate the server(s) 112 determining the audio source based on the command determined from the text, the disclosure is not limited thereto and the server(s) 112 may determine the audio source based on additional input (e.g., from the speaker controller 22) and/or may send a command to a remote device (e.g., the speaker controller 22) to determine the audio source. For example, the speaker controller 22 may directly access audio sources and the server(s) 112 may send an instruction to the speaker controller 22 to determine an audio source, receive audio data from the audio source and send the audio data to the speaker(s) 20. In some examples, the speaker controller 22 may have access to audio sources that the server(s) 112 are unable to access, such as a paid subscription to an audio source or the like. FIG. 8D illustrates an example of the server(s) 112 sending an instruction to the speaker controller 22 to determine the audio source and receive audio data directly from the audio source. Additionally or alternatively, the speaker controller 22 may provide additional input to the server(s) 112, such as a list of audio sources or the like. FIG. 8E illustrates an example of the speaker controller 22 sending additional information about an audio source (e.g., list of audio sources) and/or speaker (e.g., list of speaker(s) 20, address associated with the speaker(s) 20, or the like).

FIG. 8D illustrates an example of the server(s) 112 instructing the speaker controller 22 to send audio data to speaker(s) 20. In some examples, the speaker controller 22 may receive audio data directly from a remote audio source, such as an online music service or the like. In other examples, the speaker controller 22 may receive audio data directly from a local audio source, such as a network device (e.g., a hard drive, computer, server, smartphone, etc.) connected to the speaker controller 22 directly or via a local network. As illustrated in FIG. 8D, the system 100 may perform steps 810-816 as described with regard to FIG. 8A. However, the server(s) 112 may send (850) the command to the speaker controller 22 and the speaker controller 22 may determine (852) an audio source, receive (854) audio data and send (856) audio data to the speaker(s) 20. The speaker(s) 20 may play (858) the output audio using the audio data. As discussed above, the server(s) 112 may send audio data associated with the command to the speaker 20 in addition to the audio data associated with the audio source 40 (e.g., music or the like).

In some examples, the server(s) 112 may receive additional input data from the speaker controller 22 prior to the server(s) 112 sending audio data to the speaker(s) 20. For example, the speaker controller 22 may provide additional input to the server(s) 112, such as a list of audio sources, a list of speaker(s) 20, addresses associated with the speaker(s) 20, or the like. FIG. 8E illustrates an example of the server(s) 112 receiving information from speaker controller 22 and sending audio data directly to speaker(s) 20. As illustrated in FIG. 8E, the system 100 may perform steps 810-816 as described with regard to FIG. 8A. However, the server(s) 112 may send (860) a request to the speaker controller 22 for information about an audio source and/or speaker (e.g., network address or other configuration information associated with the speaker) and the speaker controller 22 may determine (862) an audio source and/or speaker and send (864) the audio source and/or speaker to the server(s) 112. Using the information provided by the speaker controller 22, the server(s) 112 may generate (866) a URL for the audio source and send (868) the URL to the speaker(s) 20. The speaker(s) may stream audio data using the URL and may play (870) the output audio using the audio data. As discussed above, the server(s) 112 may send audio data associated with the command to the speaker 20 in addition to the audio data associated with the audio source 40 (e.g., music or the like).

In some examples, the server(s) 112 may determine that the audio source is local to the device 110b. For example, the audio source may be a network device, such as a hard drive, a computer, a server, a smartphone or the like, that is connected to the device 110b directly (e.g., via Universal Serial Bus (USB), Bluetooth or the like) or via a local network. FIG. 8F illustrates an example of the device 110b receiving audio data from a local audio source. As illustrated in FIG. 8F, the system 100 may perform steps 810-818 as described with regard to FIG. 8A. However, the server(s) 112 may send (880) a command to the device 110b and the device 110b may receive (882) audio data from a local audio source (e.g., the network device) and send (884) the audio data to the speaker(s) 20 so that the speaker(s) 20 may play (886) output audio using the audio data. Thus, the server(s) 112 may receive input audio data corresponding to a voice command and may instruct the device 110b to send output audio data from the local audio source to the speaker(s) 20.

Figure 9A:
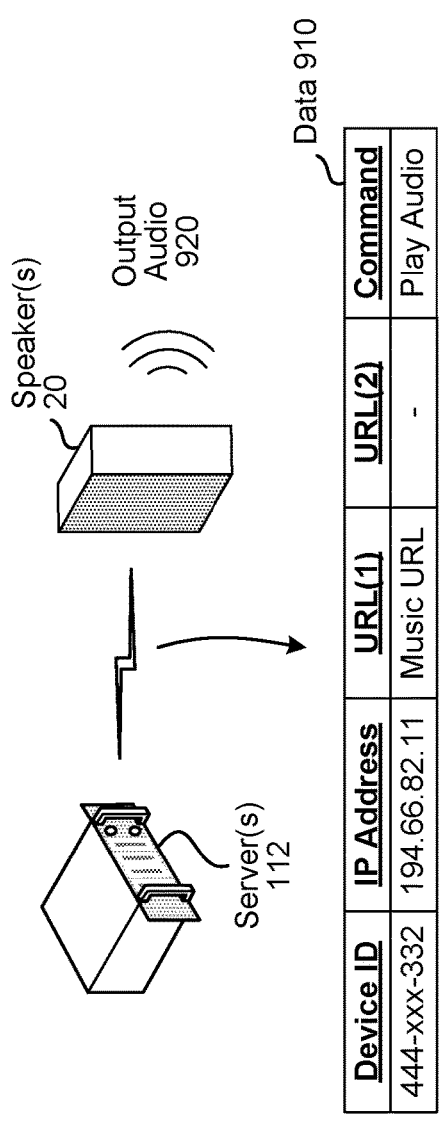
FIGS. 9A-9B illustrate examples of data sent to a speaker according to embodiments of the present disclosure.
Figure 9B:
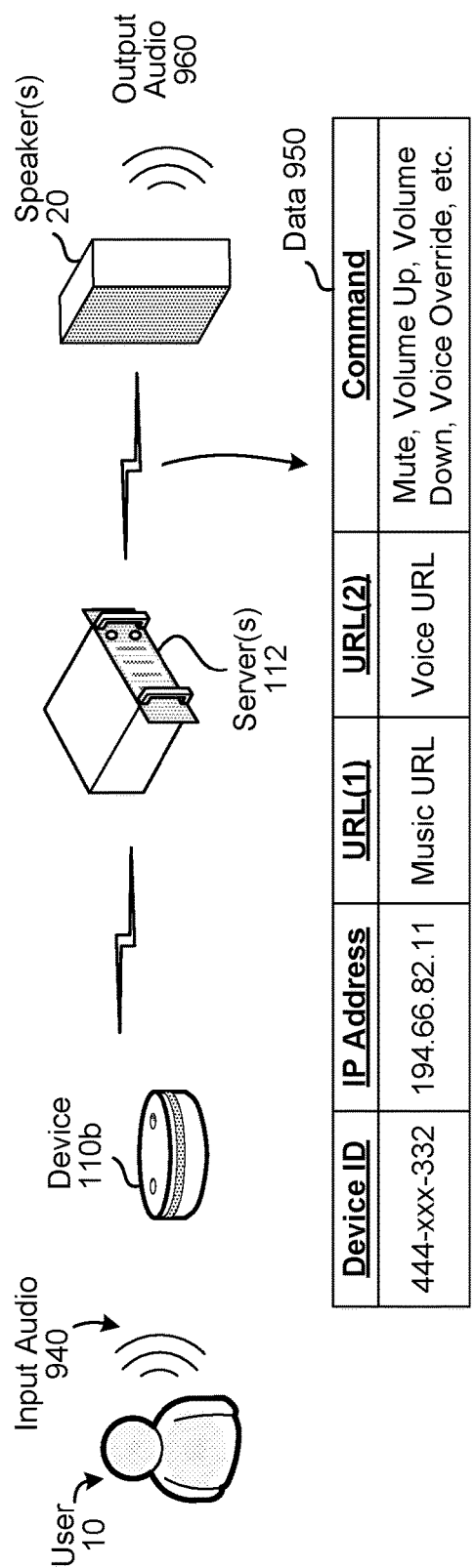

FIGS. 9A-9B illustrate examples of data sent to a speaker according to embodiments of the present disclosure. As illustrated in FIG. 9A, server(s) 112 may send data 910 to speaker(s) 20 to generate output audio 920, such as music. For example, the server(s) 112 may stream first audio data corresponding to music (e.g., music by the Rolling Stones) to the speaker(s) 20. The data 920 may include information such as a device ID and IP address associated with the speaker(s) 20, a first URL address (e.g., music URL) associated with the first audio data and a command (e.g., "Play Audio") instructing the speaker(s) 20 to perform an action, such as playing the first audio data streaming via the first URL address.

While the first example illustrated in FIG. 9A corresponds to the output audio 920 including music, FIG. 9B illustrates a second example where the output audio 960 includes music and voice output. As illustrated in FIG. 9B, device 110b may receive input audio 940 from user 10 including a command and the device 110b may send audio data corresponding to the input audio 940 to the server(s) 112. The server(s) 112 may determine the command and may send data 950 to speaker(s) 20 to generate output audio 960, which includes music and voice output. For example, the command may instruct the server(s) 112 to mute the output audio, adjust a volume of the audio or similar functionality. In response to some commands, the server(s) 112 may generate voice output indicating to the user 10 that the command was performed. For example, the voice output may state "audio muted," "increasing volume," "decreasing volume" or the like. Thus, the output audio 960 may include the music playing at a first volume and the voice output playing at a second volume higher than the first volume.

The data 950 may include information such as a device ID and IP address associated with the speaker(s) 20, a first URL address (e.g., music URL) associated with the first audio data, a second URL address (e.g., voice URL) associated with second audio data (e.g., voice output) and a command (e.g., "mute," "volume up," "volume down," "voice override," etc.) instructing the speaker(s) 20 to perform an action. While FIGS. 9A-9B illustrate several commands, the disclosure is not limited thereto and the data 910/950 may include any command known to one of skill in the art.

The voice override command may instruct the speaker(s) 20 to reduce a volume of the first audio data (e.g., music) when input audio is received by a device 110 in proximity to the speaker(s) 20. For example, a speaker 20 may be generating output audio in a first room when a device 110 in the first room detects input audio from the user 10. If the speaker 20 continues to generate the output audio, the output audio may be received by the device 110 in addition to the input audio and may reduce a likelihood of the server(s) 112 correctly interpreting the input audio. To improve a likelihood of the server(s) 112 correctly interpreting the input audio and/or reduce a processing consumption associated with determining a command included in the input audio, the system 100 may instruct the speaker 20 to reduce a volume of the output audio or mute the output audio.

FIGS. 10A-10B illustrate communication and operations among devices to determine that a voice command is being received and lower a volume of corresponding output audio according to embodiments of the present disclosure. FIG. 10A illustrates an example of the server(s) 112 sending output audio data to speaker(s) 20 directly when receiving the voice command. As illustrated in FIG. 10A, the server(s) 112 may send (1006) output audio data to the speaker(s) 20 and the speaker(s) 20 may play (1008) output audio using the output audio data. While the speaker(s) 20 are playing the output audio, a device 110 may receive (1010) input audio and may send (1012) an indicator of input audio to the server(s) 112. In some examples, the device 110 may identify a wakeword in the input audio, which is a specific word instructing the device 110 to process a command using the input audio that follows the wakeword. However, the disclosure is not limited thereto and the device 110 may send the indicator of input audio to the server(s) 112 without requiring the wakeword be present in the input audio. The server(s) 112 may determine (1014) a location of the input audio (e.g., a location of the device 110 and/or a precise location of the user 10 and may determine (1016) output devices corresponding to the location. For example, the server(s) 112 may determine that the device 110 is in the first room and may identify multiple speaker(s) 20 in the first room. The server(s) 112 may generate (1018) a command to lower a volume of the output audio and may send (1020) the command to the speaker(s) 20. In response to receiving the command, the speaker(s) 20 may lower a volume of the output audio and/or mute the output audio entirely. Therefore, the device 110 may receive additional input audio without interference from the output audio.

While FIG. 10A illustrates the example of the server(s) 112 sending the output audio data to the speaker(s) 20 directly, in some examples the system 100 may determine that the voice command is being received and lower the volume of output audio that isn't sent by the server(s) 112. For example, FIG. 10B illustrates an example of the speaker controller 22 sending output audio data to the speaker(s) 20 when the device 110 receives the voice command. As illustrated in FIG. 10B, the speaker controller 22 may send (1050) output audio data to the speaker(s) 20 and the speaker(s) 20 may play (1052) output audio using the output audio data. While the speaker(s) 20 are playing the output audio, the device 110 may receive (1010) the input audio and may send (1012) the indicator of input audio to the server(s) 112. The server(s) 112 may determine (1014) the location of the input audio (e.g., the location of the device 110 and/or a precise location of the user 10 and may determine (1016) the output devices corresponding to the location. For example, the server(s) 112 may determine that the device 110 is in the first room and may identify multiple speaker(s) 20 in the first room. The server(s) 112 may generate (1018) the command to lower the volume of the output audio and may send (1020) the command to the speaker controller 22. In response to receiving the command, the speaker controller 22 may determine output devices corresponding to the command and may send a second command to the speaker(s) 20. In response to receiving the second command, the speaker(s) 20 may lower a volume of the output audio and/or mute the output audio entirely. Therefore, the device 110 may receive additional input audio without interference from the output audio.

In the examples illustrated in FIGS. 10A-10B, the user 10 is not requesting that the volume of the output audio be turned down. Instead, the user 10 may be instructing the server(s) 112 to perform a different command, such as increasing the volume of the output audio. However, to improve a likelihood of the server(s) 112 correctly interpreting the input audio and/or to reduce a processing consumption associated with determining a command included in the input audio, the system 100 may identify the output devices in proximity to the user 10 and instruct the output devices to reduce a volume of the output audio or mute the output audio.

The system 100 may reduce the volume of the output audio and/or mute the output audio for at least the duration of time that the system 100 receives the input audio. For example, the system 100 may reduce the volume of the output audio while the user 10 is speaking. In some examples, the system 100 may reduce the volume of the output audio for a longer period of time, including when the system 100 is processing the input audio data, determining a command and executing the command. For example, the system 100 may reduce the volume of the output audio while the user 10 is speaking and until the system 100 correctly interprets and executes a corresponding command. Thus, the system 100 may execute the command and resume a previous volume of the output audio.

In some examples, the user 10 may be located in a house and the system 100 may generate the output audio in one or more rooms of the house. For example, the house may include multiple speaker systems (e.g., speaker(s) 20) that are not connected to the device 110 and the system 100 may control the multiple speaker systems to play music from an audio source in response to a voice command. When the system 100 receives the input audio, the system 100 may control one or more speaker(s) 20 (of the multiple speaker systems) that are in proximity to the user 10 to lower a volume of the output audio. Additionally or alternatively, the system 100 may control the multiple speaker systems to play audio corresponding to a video source, such as playing output audio over the speaker(s) 20 while displaying output video on a television. When the system 100 receives the input audio, the system 100 may control the speaker(s) 20 to lower a volume of the output audio while pausing the output video on the television. In another example, the user 10 may be located in a car and the system 100 may generate the output audio 30 using speaker(s) 20 installed (e.g., hardwired) in the car. When the system 100 receives the input audio, the system 100 may control the speaker(s) 20 to lower a volume of the output audio.

While the examples illustrated above describe the device 110 capturing input audio data, the disclosure is not limited thereto. Instead, in some examples the system 100 may receive input audio data from a separate device. For example, a remote control may be connected to a device 110 and the device 110 may be connected to the server(s) 112 via the network(s) 199. Thus, the remote control may capture the input audio data using a microphone and may send the input audio data to the server(s) 112 via the device 110.

In some examples, the separate device (e.g., remote control) and/or device 110 may include a physical button and may have "push-to-talk" or "tap-to-talk" functionality, wherein the user 10 may push the button, speak an utterance and release the button. The separate device and/or device 110 may capture input audio data while the button is pressed and may send the input audio data to the server(s) 112 for speech processing. In some examples, in addition to sending the input audio data to the server(s) 112, the separate device/device 110 may send an instruction to the speaker(s) 20 and/or television to reduce a volume level of the output audio and/or pause the video. For example, when the user 10 presses the button on a remote control, the remote control may capture input audio data, send the input audio data to the server(s) 112 via the device 110 and send an instruction to the speaker(s) 20/television to reduce a volume level of the output audio and pause the video. Additionally or alternatively, the server(s) 112 may receive the input audio data from the separate device/device 110 and may send the instruction to the speaker(s) 20 and/or television to reduce the volume level of the output audio and/or pause the video.

In some examples, the system 100 may determine that input audio data is received from a near-field device and may not turn down the volume level. For example, the device 110 may be a far-field device (e.g., captures input audio data using a first microphone configured to detect audio within a large range, such as a room) and the separate device may be a near-field device (e.g., captures input audio using a second microphone configured to detect audio within a small range, such as a 0-3 feet). Thus, when the system 100 receives first input audio data captured from the device 110 (e.g., using the first microphone), the system 100 may send an instruction to the speaker(s) 20 to reduce the volume level of output audio, as the output audio may interfere with capturing the first input audio data. However, when the system 100 receives second input audio data captured from the separate device (e.g., using the second microphone), the system 100 may not send the instruction to the speaker(s) 20 as the output audio does not interfere with capturing the second input audio data. While the example above describes the device 110 as a far-field device, the present disclosure is not limited thereto and the device 110 may be a far-field device, a near-field device or a combination thereof. For example, the device 110 may include a physical button and may operate as a far-field device when the button is not pressed and may operate as a near-field device when the button is pressed without departing from the disclosure.

In some examples, the system 100 doesn't reduce the volume level of the output audio when the input audio data is captured, but instead reduces the volume level of the output audio when voice output is generated by the speaker(s) 20. For example, the speaker(s) 20 may be generating the output audio while the device 110 captures input audio data instructing the system to select a particular music track for playback. While the device 110 captures the input audio data, the speaker(s) 20 may generate the output audio at a first volume level. After the system 100 interprets a command from the input audio data, the system 100 may generate the voice output data and send the voice output data to the speaker(s) 20. The speaker(s) 20 may reduce a volume of the output audio from the first volume level to a second volume level while generating the voice output, then increase the volume of the output audio from the second volume level to the first volume level.

In some examples, the system 100 may not reduce the volume level of the output audio when input audio data is captured, but may reduce the volume level of the output audio if the system 100 cannot interpret the input audio data above a minimum accuracy threshold. For example, the system 100 may capture first input audio data while the speaker(s) 20 generate output audio at a first volume level. Due at least in part to the output audio, the system 100 may generate a first command with a confidence level below the minimum accuracy threshold, indicating that the system 100 is unable to correctly interpret the first input audio data. The system 100 may send an instruction to the speaker(s) 20 to reduce a volume of the output audio from the first volume level to a second volume level and may capture second input audio data. Due to the output audio being generated at the second volume level, the system 100 may generate a second command with a confidence level above the minimum accuracy threshold. In some examples, the system 100 may generate voice output data requesting the user 10 to repeat the command. For example, after generating the first command with the confidence level below the minimum accuracy threshold, the system 100 may generate the voice output data, may send an instruction to the speaker(s) 20 to reduce the volume of the output audio and may send the voice output data to the speaker(s) 20 for playback. Thus, the speaker(s) 20 may reduce the volume of the output audio, generate voice output requesting the user 10 to repeat the command and the system 100 may capture the second input audio data.

Figure 11:
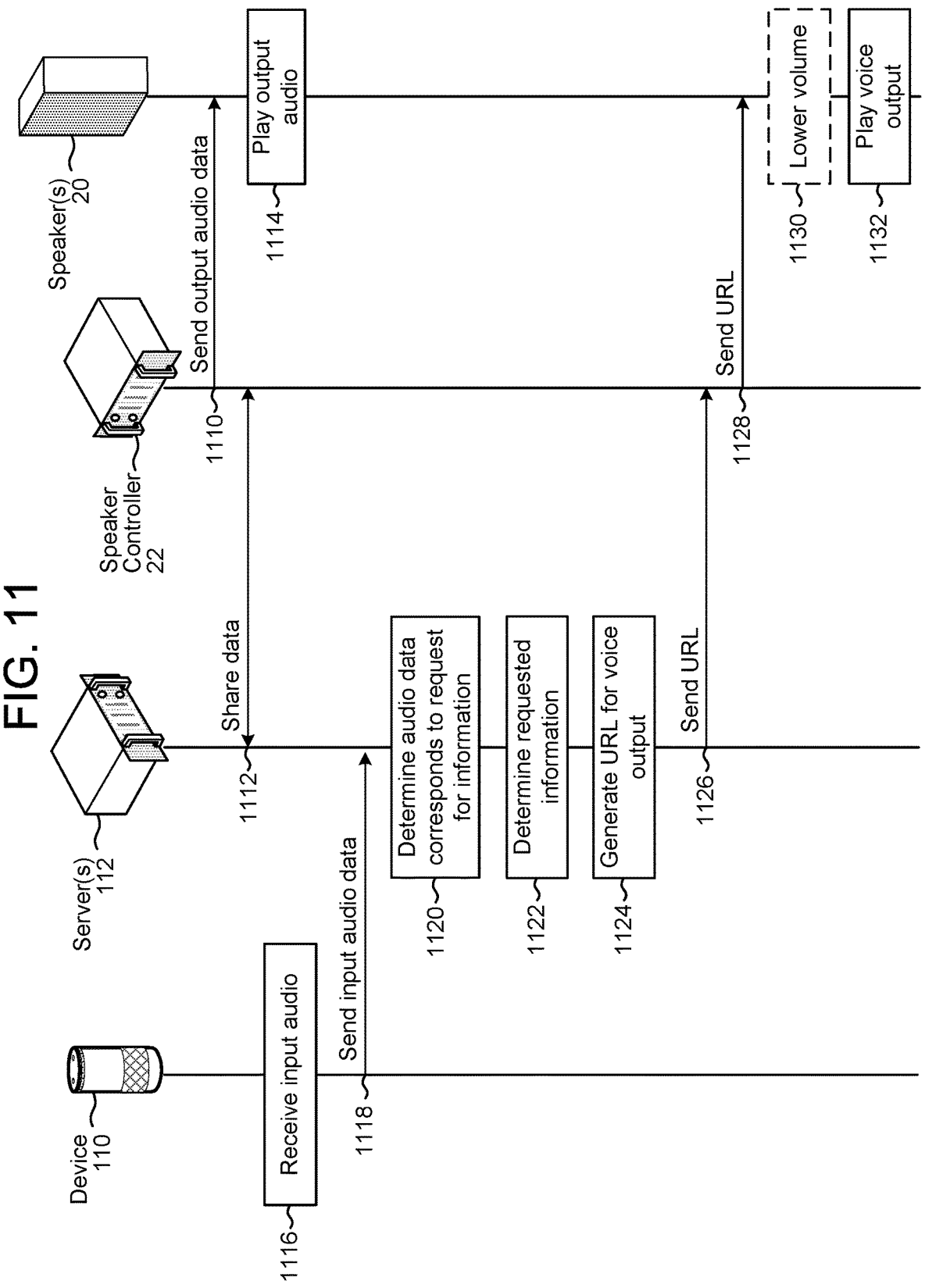
FIG. 11 illustrates communication and operations among devices to respond to a query according to embodiments of the present disclosure.

FIG. 11 illustrates communication and operations among devices to respond to a query according to embodiments of the present disclosure. In some examples, the user 10 may ask a question or issue a command to the server(s) 112 that requires information from the speaker controller 22. For example, the speaker controller 22 may be sending audio to the speaker(s) 20 and the user 10 may ask what song is playing. As the server(s) 112 are not involved in sending the audio data, to answer the question the server(s) 112 may require bidirectional communication with the speaker controller 22 enabling the server(s) 112 to already know and/or request the song title.

As illustrated in FIG. 11, speaker controller 22 may send (1110) output audio data to speaker(s) 20 and share (1112) data (e.g., location within song, song title, artist name, album name, audio source, etc.) with server(s) 112. While speaker(s) 20 play (1114) output audio using the output audio data, the device 110 may receive (1116) input audio and may send (1118) input audio data to the server(s) 112. While not illustrated in FIG. 11, the system 100 may use the steps illustrated in FIGS. 10A-10B to reduce a volume of the output audio while the device 110 receives the input audio.

The server(s) 112 may determine (1120) that the input audio data corresponds to a query of "What's playing," which is a command instructing the server(s) 112 to inform the user 10 of what song and artist is currently being played in the output audio. The server(s) 112 may determine (1122) what song is playing using the data shared from the speaker controller 22. For example, the server(s) 112 may determine an artist name and song title associated with the output audio from previously shared data. However, the disclosure is not limited thereto and the server(s) 112 may send a request to the speaker controller 22 for additional data in response to the input audio data.

The server(s) 112 may generate (1124) a URL for voice output and may send (1126) the URL to the speaker controller 22. The speaker controller 22 may send (1128) the URL to the speaker(s) 20. The speaker(s) 20 may optionally lower (1130) a volume of the output audio (indicated by the dotted line) and may play (1132) voice output corresponding to voice output data received using the URL. However, the disclosure is not limited thereto and in some examples the speaker controller 22 may receive the voice output data using the URL and may send the voice output data to the speaker(s) 20.

Thus, the server(s) 112 may receive data shared from the speaker controller 22 and may use the shared data to generate voice output to the user 10. While FIG. 11 illustrates an example of the server(s) 112 responding to a query of "What's playing," the disclosure is not limited thereto and similar techniques may be used to respond to multiple queries/commands received by the device 110 from the user 10.

Figure 12:
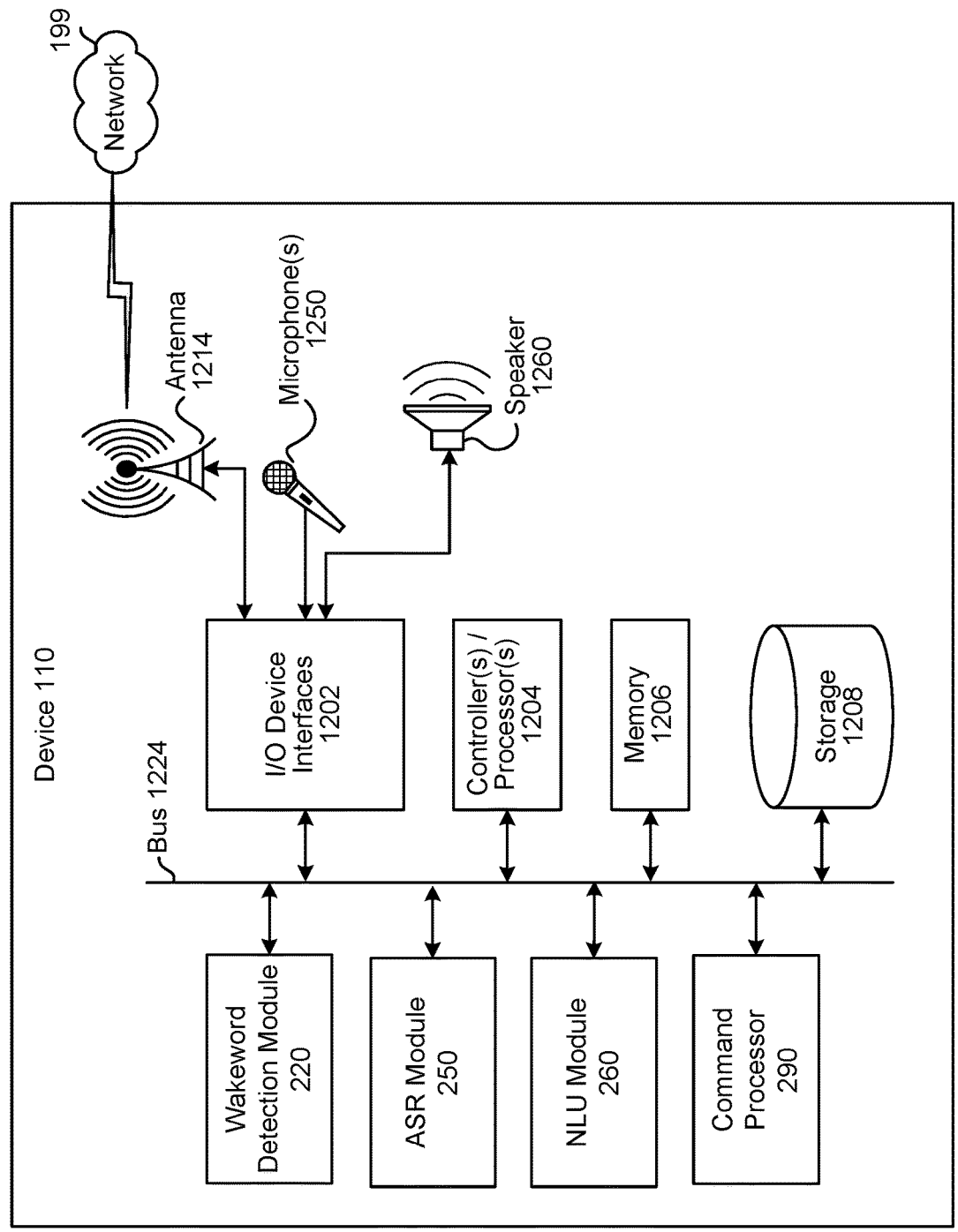
FIG. 12 is a block diagram conceptually illustrating example components of a device according to embodiments of the present disclosure.
Figure 13:
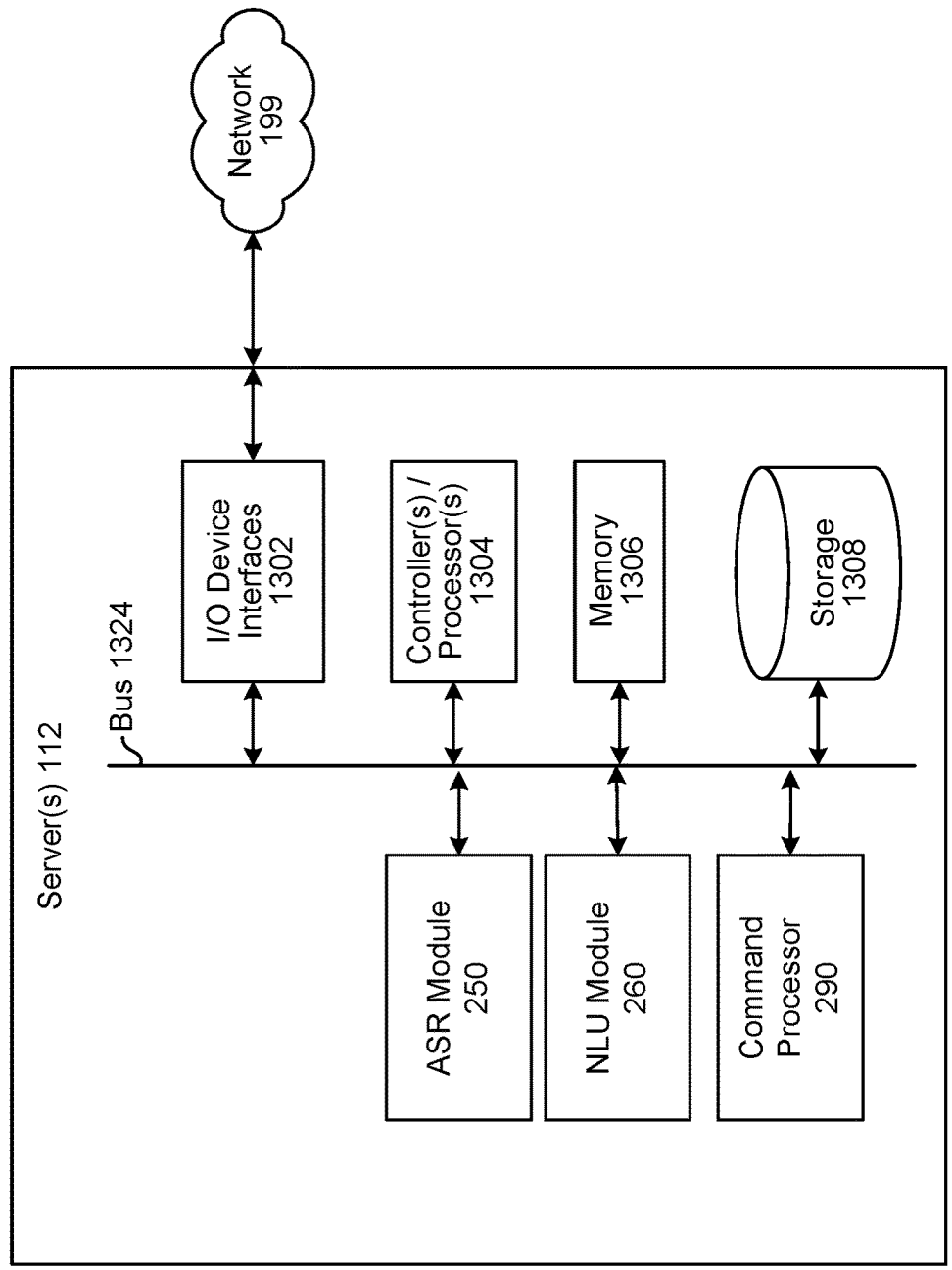
FIG. 13 is a block diagram conceptually illustrating example components of a server according to embodiments of the present disclosure.

FIG. 12 is a block diagram conceptually illustrating a local device 110 that may be used with the described system. FIG. 13 is a block diagram conceptually illustrating example components of a remote device, such as a remote server(s) 112 that may assist with ASR, NLU processing, or command processing. Multiple such server(s) 112 may be included in the system, such as one server(s) 112 for ASR, one server(s) 112 for NLU, etc. In operation, each of these devices may include computer-readable and computer-executable instructions that reside on the respective device (110/112), as will be discussed further below.

Each of these devices (110/112) may include one or more controllers/processors (1204/1304), that may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive (MRAM) and/or other types of memory. Each device may also include a data storage component (1208/1308), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1202/1302).

Computer instructions for operating each device (110/112) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/112) includes input/output device interfaces (1202/1302). A variety of components may be connected through the input/output device interfaces, as will be discussed further below. Additionally, each device (110/112) may include an address/data bus (1224/1324) for conveying data among components of the respective device. Each component within a device (110/112) may also be directly connected to other components in addition to (or instead of) being connected to other components across the bus (1224/1324).

Referring to the device 110 of FIG. 12, the device 110 may include a display 1218, which may comprise a touch interface 1219. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 1202 that connect to a variety of components such as an audio output component such as a speaker 1260, a wired headset or a wireless headset (not illustrated) or other component capable of outputting audio. The device 110 may also include an audio capture component. The audio capture component may be, for example, a microphone 1250 or array of microphones, a wired headset or a wireless headset (not illustrated), etc. The microphone 1250 may be configured to capture audio. If an array of microphones is included, approximate distance to a sound's point of origin may be performed acoustic localization based on time and amplitude differences between sounds captured by different microphones of the array. The device 110 (using microphone 1250, wakeword detection module 220, ASR module 250, etc.) may be configured to determine audio data corresponding to detected audio data. The device 110 (using input/output device interfaces 1202, antenna 1214, etc.) may also be configured to transmit the audio data to server(s) 112 for further processing or to process the data using internal components such as a wakeword detection module 220.

For example, via the antenna(s), the input/output device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server(s) 112 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words.

The device 110 and/or server(s) 112 may include a limited or extended NLU module 260. The NLU module in device 110 may be of limited or extended capabilities. The NLU module 260 may comprise the name entity recognition module 262, the intent classification module 264 and/or other components. The NLU module 260 may also include a stored knowledge base and/or entity library, or those storages may be separately located.

The device 110 and/or server(s) 112 may also include a command processor 290 that is configured to execute commands/functions associated with a spoken command as described above.

The device 110 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 1208 may store data relating to keywords and functions to enable the wakeword detection module 220 to perform the algorithms and methods described above. The locally stored speech models may be preconfigured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 1208 and compare the captured audio to the stored models and audio sequences using audio comparison, pattern recognition, keyword spotting, audio signature, and/or other audio processing techniques.

A device 110 may be associated with a user profile. For example, as illustrated in FIG. 7, a device may be associated with a user profile (where the user profile may be the same or different across the devices). For example, a device may be associated with a user identification (ID) number or other profile information linking the device to a user account. The user account/ID/profile may be used by the system to perform speech controlled commands (for example commands discussed above in reference to FIG. 2). The user account/ID/profile may be associated with particular model(s) or other information used to identify received audio, classify received audio (for example as a non-environmental sound, human generated sounds, and/or speech), etc. Different user profiles may be linked (for example in the case of family members) or may be unaffiliated.

The server may include a model training component 1370. Various machine learning techniques may be used to perform various steps described above, such as routing an NLU request, determining whether a session as ended, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Many different training example utterances may be used during training to, for example, train machine learning model(s) to be used by an NLU router 280, or the like.

As noted above, multiple devices may be employed in a single speech processing system. In such a multi-device system, each of the devices may include different components for performing different aspects of the speech processing. The multiple devices may include overlapping components. The components of the devices 110 and server(s) 112, as illustrated in FIGS. 12 and 13, are exemplary, and may be located a stand-alone device or may be included, in whole or in part, as a component of a larger device or system.

As illustrated in FIG. 14 multiple devices (20, 22, 110a-110f, 112) may contain components of the system 100 and the devices may be connected over a network 199. Network 199 may include a local or private network or may include a wide network such as the internet. Devices may be connected to the network 199 through either wired or wireless connections. For example, a speech controlled device 110a, a speech controlled device 110b, a television 110c, a refrigerator 110d, a smart watch 110e, smartphone 110f, and/or a vehicle 110g may be connected to the network 199 through a wireless service provider, over a WiFi or cellular network connection or the like. Other devices are included as network-connected support devices, such as a server(s) 112, speaker controller 22 or others. The support devices may connect to the network 199 through a wired connection or wireless connection. Networked devices 110 may capture audio using one-or-more built-in or connected microphones 1250 or audio capture devices, with processing performed by ASR, NLU, or other components of the same device or another device connected via network 199, such as an ASR 250, NLU 260, etc. of one or more server(s) 112.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a first networking component of an input device in a first location, input audio data corresponding to an utterance;
   determining an identifier corresponding to an output device causing audio to be output in the first location; and
   based on receiving the input audio data, sending, to a second networking component associated with the identifier, an override command to reduce a volume of the audio.

2. The computer-implemented method of claim 1, wherein the override command causes the output device to cease output of the audio.

3. The computer-implemented method of claim 1, further comprising:
   determining that the output device is causing the audio to be output at least partially during receipt of the input audio data,
   wherein sending the override command is further based at least in part on determining that the output device is causing the audio to be output at least partially during receipt of the input audio data.

4. The computer-implemented method of claim 1, further comprising:
   determining that the input audio data comprises a representation of a wakeword,
   wherein sending the override command is further based at least in part on determining that the input audio data comprises the representation.

5. The computer-implemented method of claim 1, wherein the override command causes the output device to output the audio at a first volume, the first volume being below a second volume of the utterance.

6. The computer-implemented method of claim 1, further comprising:
identifying a user profile associated with the input device; and
identifying, using the user profile, that the output device is associated with the first location.

7. The computer-implemented method of claim 1, further comprising:
determining the utterance has concluded; and
after determining that the utterance has concluded, using the second networking component to cause the output device to increase the volume of the audio.

8. A system comprising:
at least one processor; and
at least one memory including instructions that, when executed by the at least one processor, cause the system to:
receive, from a first networking component of an input device in a first location, input audio data corresponding to an utterance;
determine an identifier corresponding to an output device causing audio to be output in the first location; and
based on receiving the input audio data, send, to a second networking component associated with the identifier, an override command to reduce a volume of the audio.

9. The system of claim 8, wherein the override command causes the output device to cease output of the audio.

10. The system of claim 8, wherein the at least one memory further comprises instructions that, when executed by the at least one processor, further cause the system to:
determine that the output device is causing the audio to be output at least partially during receipt of the input audio data,
wherein the override command is sent further based at least in part on determining that the output device is causing the audio to be output at least partially during receipt of the input audio data.

11. The system of claim 8, wherein the at least one memory further comprises instructions that, when executed by the at least one processor, further cause the system to:
determine that the input audio data comprises a representation of a wakeword,
wherein the override command is sent further based at least in part on determining that the input audio data comprises the representation.

12. The system of claim 8, wherein the override command causes the output device to output the audio at a first volume, the first volume being below a second volume of the utterance.

13. The system of claim 8, wherein the at least one memory further comprises instructions that, when executed by the at least one processor, further cause the system to:
identify a user profile associated with the input device; and
identify, using the user profile, that the output device is associated with the first location.

14. The system of claim 8, wherein the at least one memory further comprises instructions that, when executed by the at least one processor, further cause the system to:
determine the utterance has concluded; and
after determining that the utterance has concluded, use the second networking component to cause the output device to increase the volume of the audio.

15. A computer-implemented method comprising:
receiving, from a first networking component of an input device in a first location, input audio data including a wakeword;
determining an identifier corresponding to an output device causing audio to be output in the first location; and
based on receiving the input audio data, sending, to a second networking component associated with the identifier, an override command to reduce a volume of the audio.

16. The computer-implemented method of claim 15, wherein the override command causes the output device to cease output of the audio.

17. The computer-implemented method of claim 15, further comprising:
determining that the output device is causing the audio to be output at least partially during receipt of the input audio data,
wherein sending the override command is further based at least in part on determining that the output device is causing the audio to be output at least partially during receipt of the input audio data.

18. The computer-implemented method of claim 15, wherein the override command causes the output device to output the audio at a first volume, the first volume being below a second volume of the wakeword.

19. The computer-implemented method of claim 15, further comprising:
identifying a user profile associated with the input device; and
identifying, using the user profile, that the output device is associated with the first location.

20. The computer-implemented method of claim 15, further comprising:
determining an utterance, associated with the input audio data, has concluded; and
after determining that the utterance has concluded, using the second networking component to cause the output device to increase the volume of the audio.

* * * * *